United States Patent
Yoo et al.

(10) Patent No.: US 9,860,448 B2
(45) Date of Patent: Jan. 2, 2018

(54) METHOD AND ELECTRONIC DEVICE FOR STABILIZING VIDEO

(71) Applicant: SAMSUNG ELECTRONICS CO., LTD., Suwon-si, Gyeonggi-do (KR)

(72) Inventors: Hyung-chul Yoo, Suwon-si (KR); Nak-hoon Kim, Suwon-si (KR); Duk-chan Seo, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 13 days.

(21) Appl. No.: 14/943,354

(22) Filed: Nov. 17, 2015

(65) Prior Publication Data

US 2017/0034410 A1    Feb. 2, 2017

(30) Foreign Application Priority Data

Jul. 27, 2015   (KR) .......................... 10-2015-0106095

(51) Int. Cl.
    H04N 5/232     (2006.01)
(52) U.S. Cl.
    CPC ....... *H04N 5/2327* (2013.01); *H04N 5/23216* (2013.01); *H04N 5/23254* (2013.01); *H04N 5/23258* (2013.01); *H04N 5/23267* (2013.01); *H04N 5/23293* (2013.01); *H04N 5/23296* (2013.01)
(58) Field of Classification Search
    CPC .......................... H04N 5/2327; H04N 5/23296
    See application file for complete search history.

(56) References Cited

U.S. PATENT DOCUMENTS

| 8,897,602 | B2 | 11/2014 | Bhrugumalla |
| 8,908,102 | B1 | 12/2014 | Crawford et al. |
| 2010/0020221 | A1 | 1/2010 | Tupman et al. |
| 2010/0289909 | A1 | 11/2010 | Tang et al. |
| 2011/0149120 | A1 | 6/2011 | Kubota |
| 2013/0170770 | A1 | 7/2013 | Chon |
| 2013/0182135 | A1 | 7/2013 | Kamoshida et al. |
| 2013/0208134 | A1 | 8/2013 | Hamalainen |
| 2013/0286240 | A1 | 10/2013 | Kim et al. |
| 2015/0077594 | A1 | 3/2015 | Nakahara |
| 2015/0113455 | A1* | 4/2015 | Kang ................. G06F 3/04842 715/765 |

(Continued)

FOREIGN PATENT DOCUMENTS

JP    2009-171362    7/2009

OTHER PUBLICATIONS

Search Report and Written Opinion dated May 20, 2016 in counterpart International Patent Application No. PCT/KR2015/012322.

*Primary Examiner* — Christopher K Peterson
(74) *Attorney, Agent, or Firm* — Nixon & Vanderhye P.C.

(57) ABSTRACT

A method of stabilizing a video in an electronic device is disclosed. The method includes determining shaking compensation areas corresponding to a respective plurality of frames acquired through an image sensor in entire areas of the respective plurality of frames based on shaking information of the plurality of frames and information on the magnification, generating output frames corresponding to the respective plurality of frames by enlarging the shaking compensation areas at the magnification, and providing a video including the output frames.

20 Claims, 30 Drawing Sheets

(56) References Cited

U.S. PATENT DOCUMENTS

2015/0146011 A1* 5/2015 Tsubusaki .......... H04N 5/23296
          348/169
2015/0371395 A1* 12/2015 Sendik ................ G06T 7/0071
          382/197

* cited by examiner

FIG. 3B
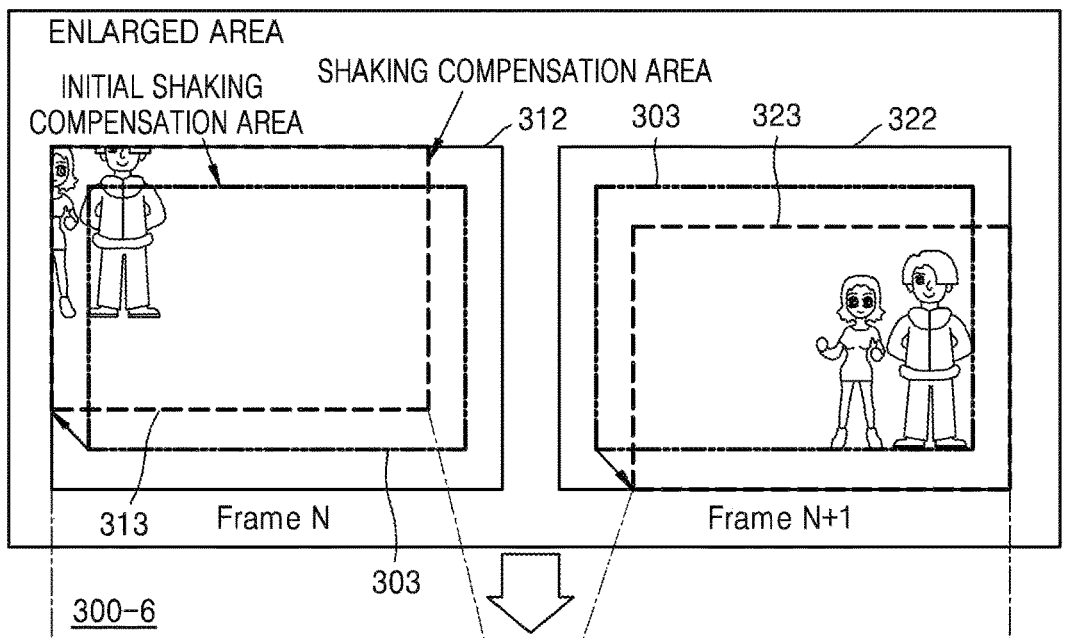
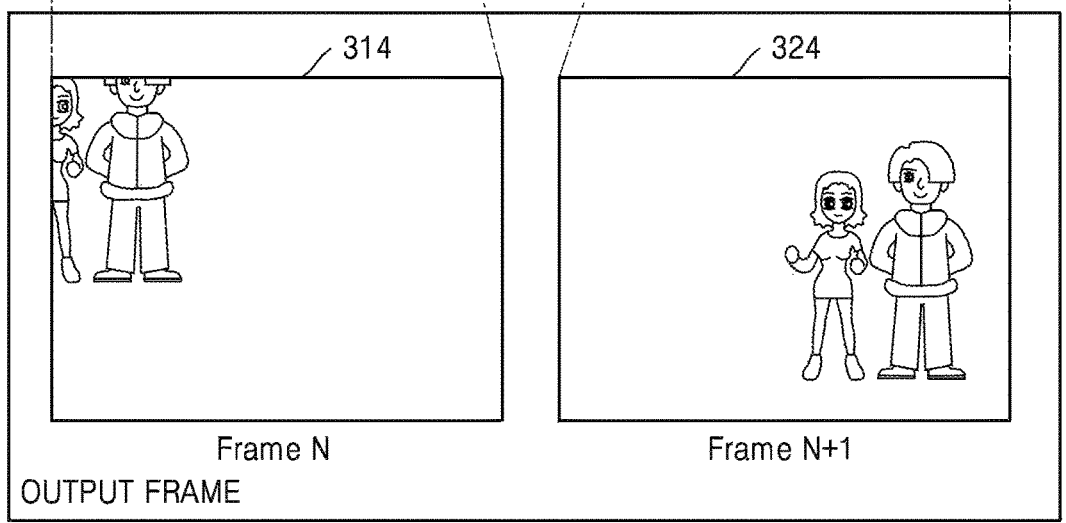

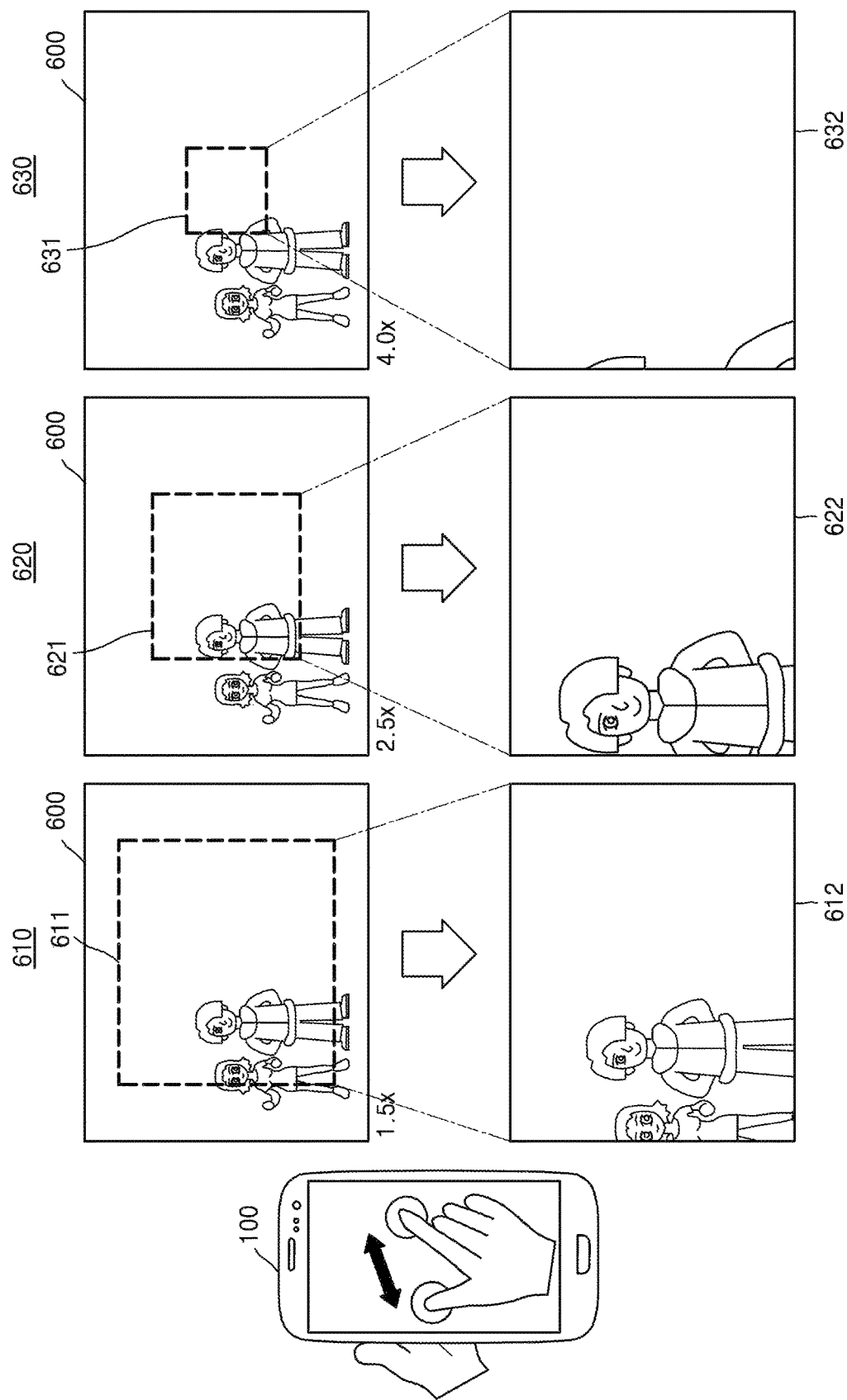

FIG. 7B
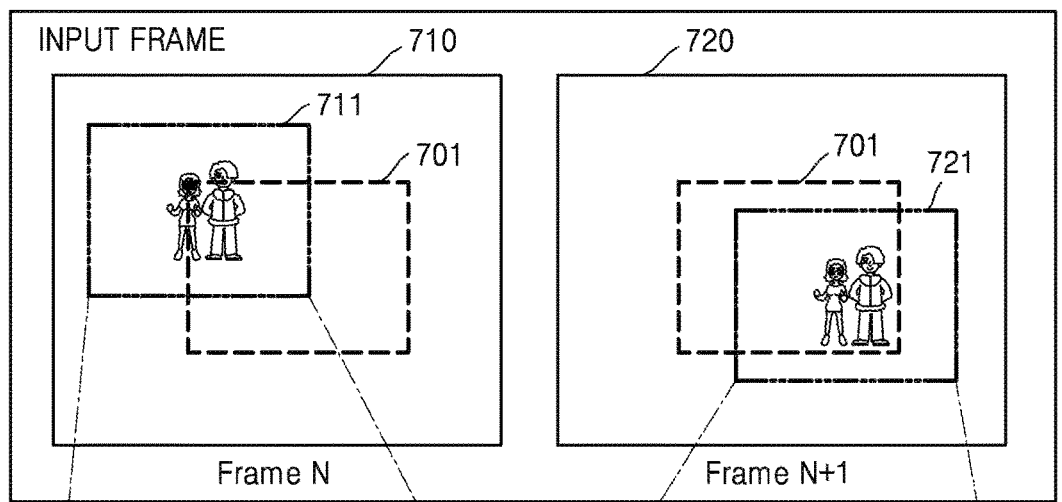
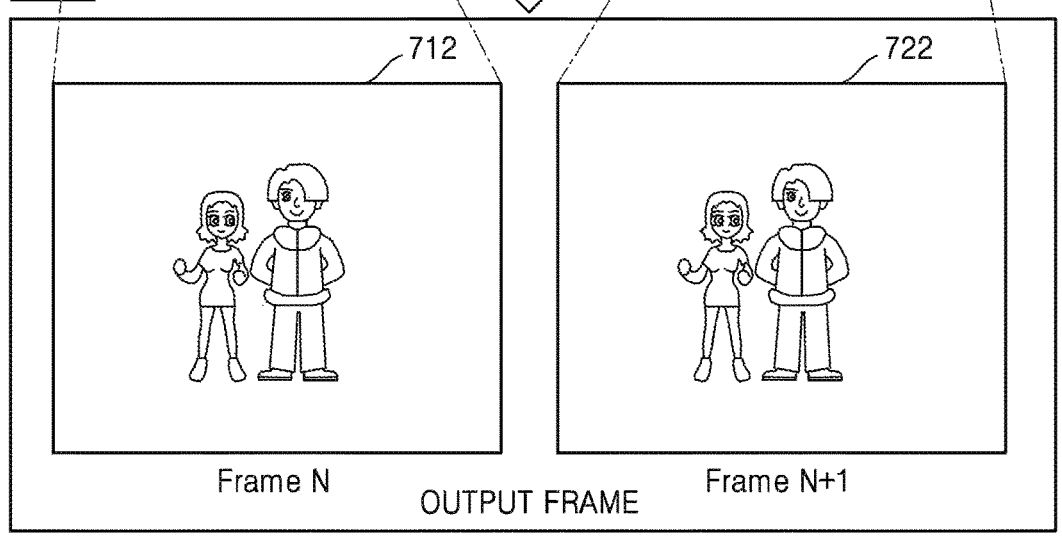
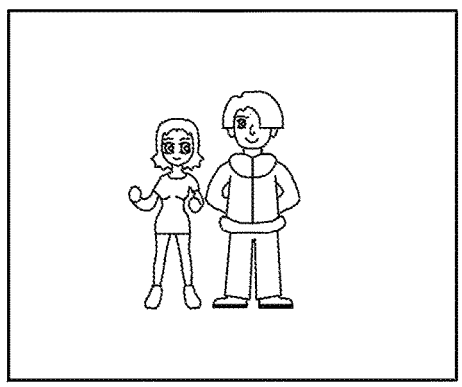

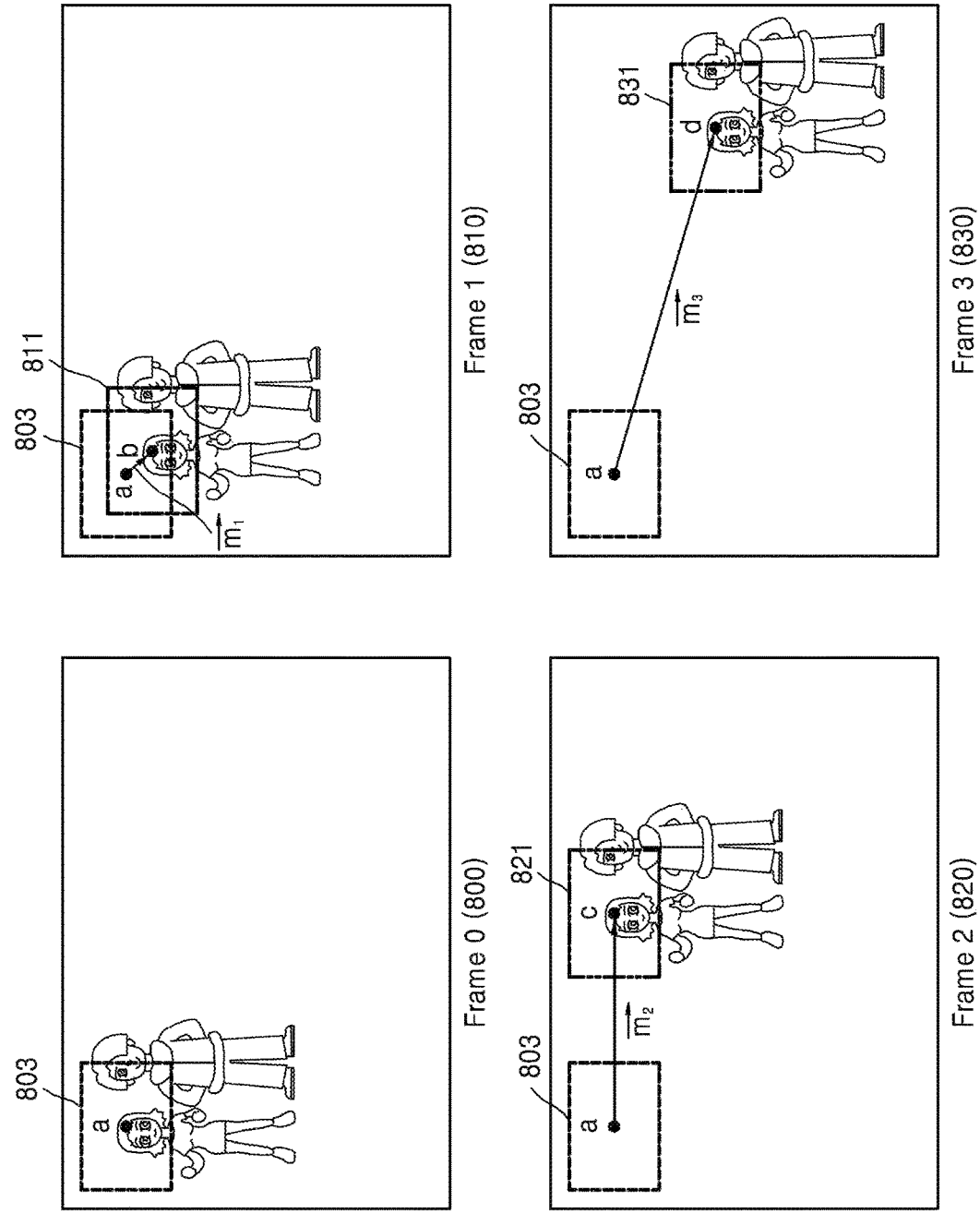

FIG. 14
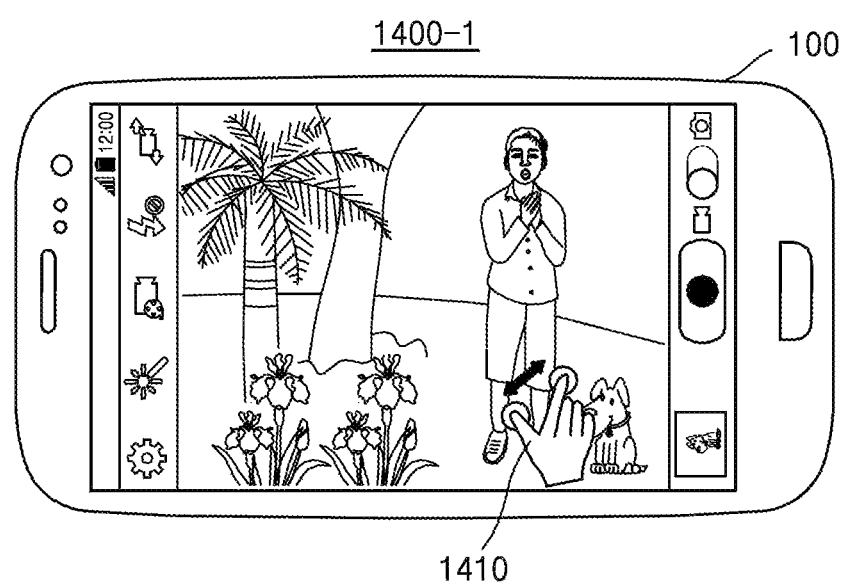
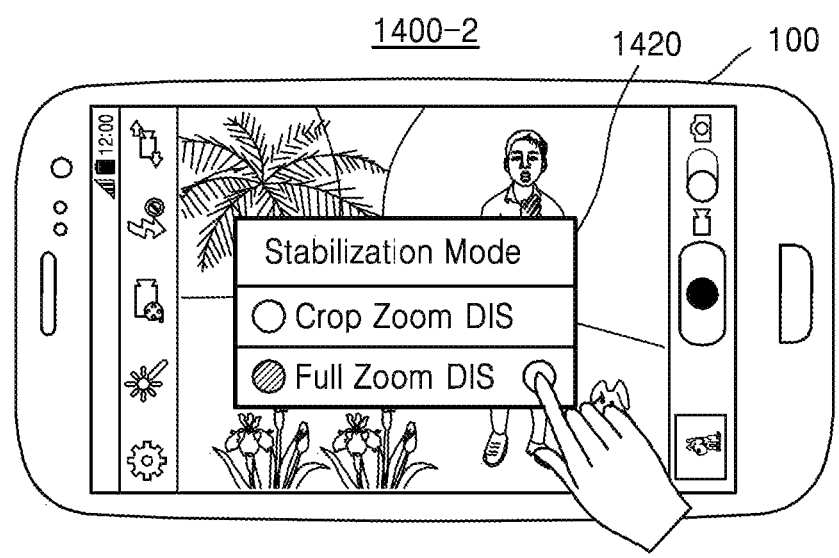

FIG. 15
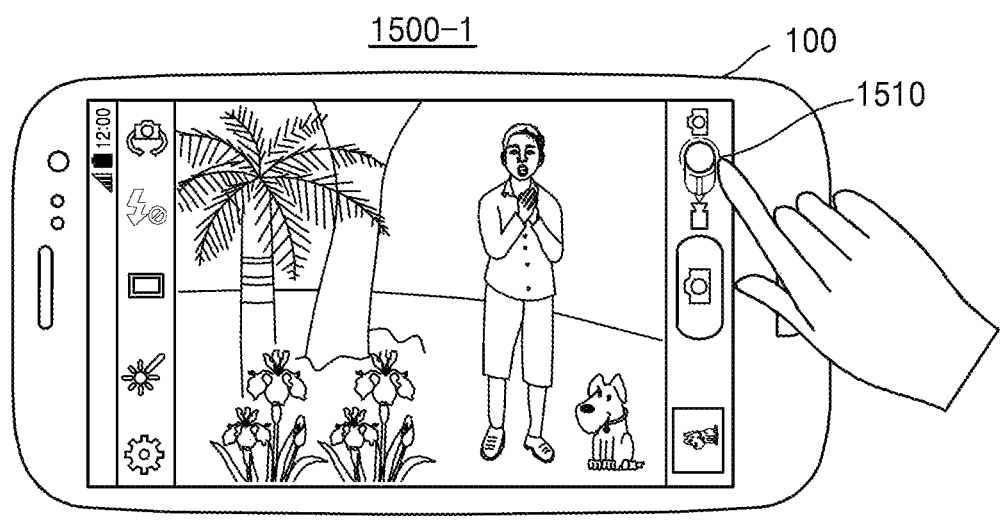
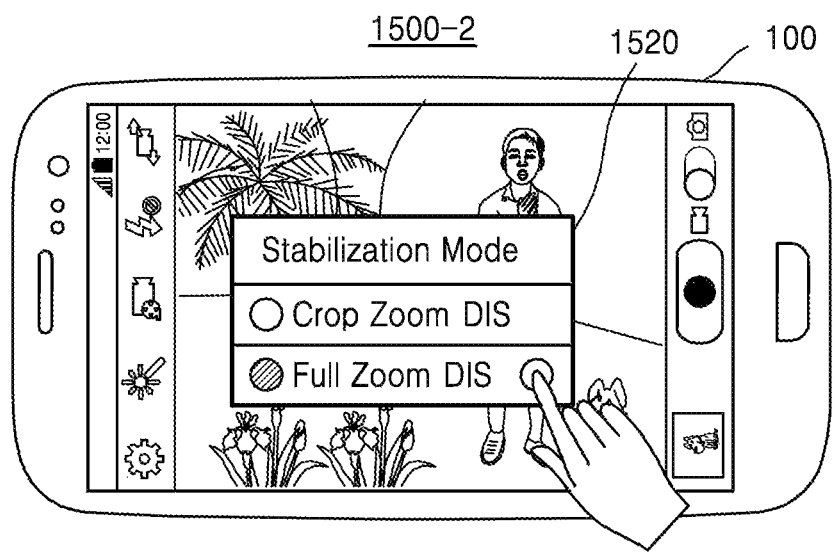

FIG. 17
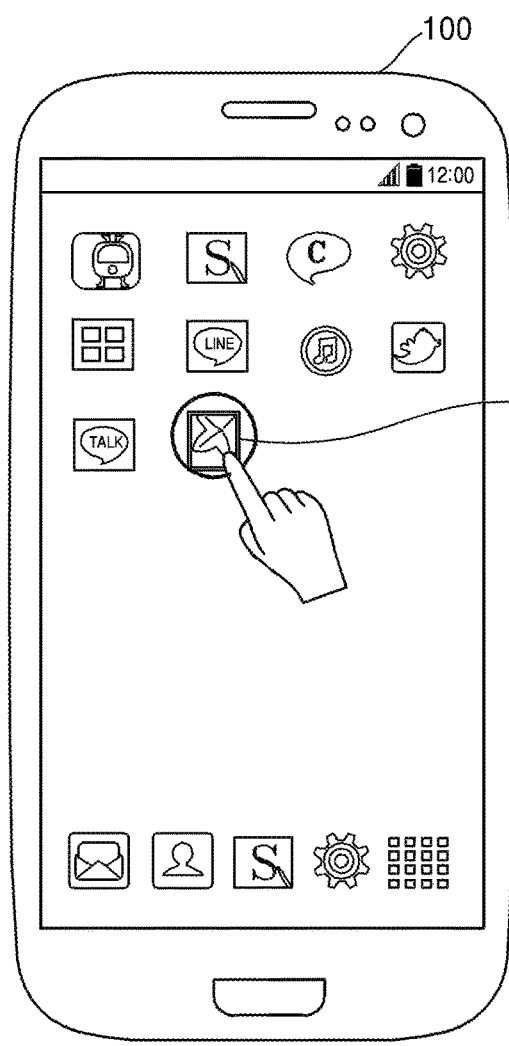
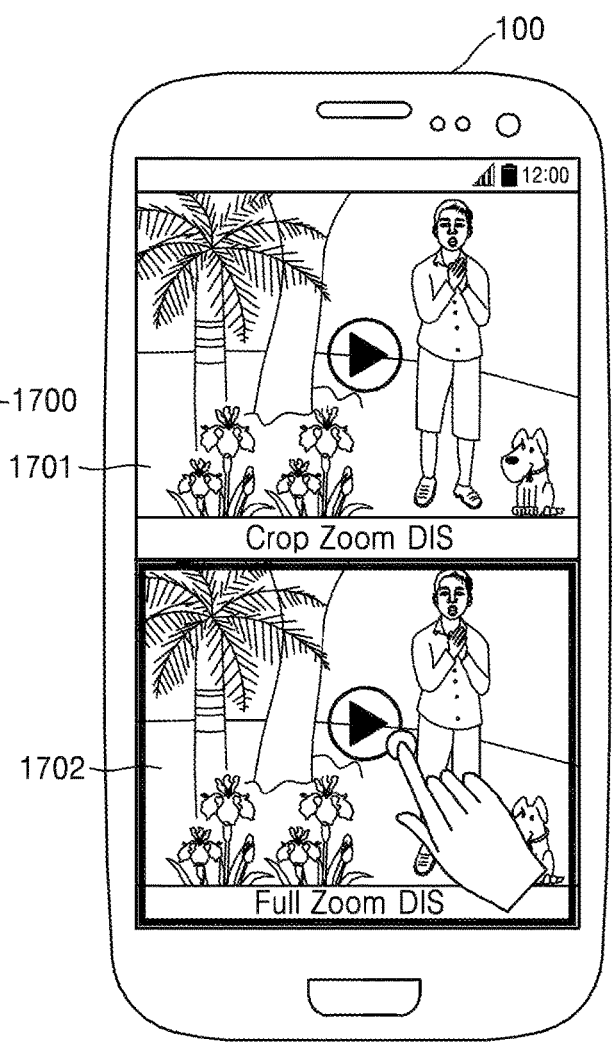

FIG. 18
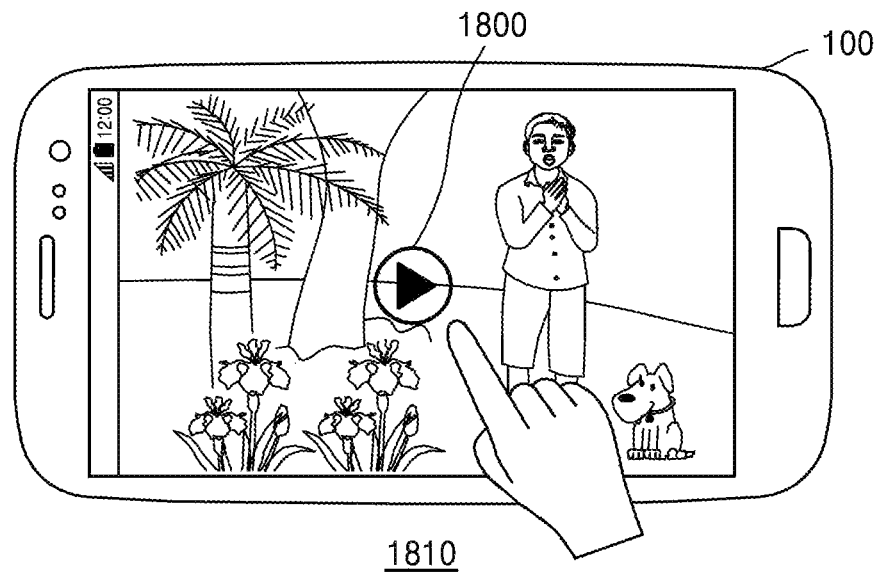
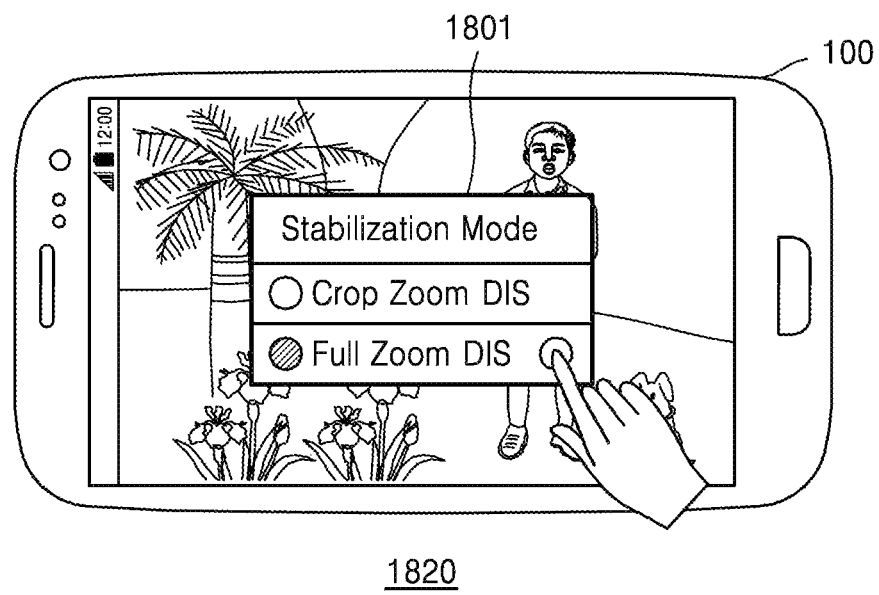

METHOD AND ELECTRONIC DEVICE FOR STABILIZING VIDEO

CROSS-REFERENCE TO RELATED APPLICATION

This application is based on and claims priority under 35 U.S.C. §119 to Korean Patent Application No. 10-2015-0106095, filed on Jul. 27, 2015, in the Korean Intellectual Property Office, the disclosure of which is incorporated by reference herein in its entirety.

BACKGROUND

1. Field

The disclosure relates to a method of stabilizing a video using digital image stabilization technology, and an electronic device for the same.

2. Description of Related Art

Image capturing devices, such as cameras and camcorders, have been widely proliferated among general consumers as well as specialized consumers. Lately, with the development of digital technology, digital image capturing devices have been proliferated. In particular, a digital image capturing device is included in a portable terminal, such as a smart phone or a tablet PC. An image captured by a digital image capturing device may have the form of a digital image.

A digital image may be processed in various ways. A digital image captured using a digital image capturing device may be edited or processed much more readily than an image captured using film. For example, a digital image capturing device may electronically increase or decrease the size of a portion of a captured image.

SUMMARY

A method of stabilizing a video for compensating for shaking of a digital zoom video caused by hand tremors or movement of a subject while the digital zoom video is captured is provided. For example, it is possible to provide a method of stabilizing a digital zoom video using the entire area of an input frame as an area in which it is possible to compensate for shaking.

Additional aspects will be set forth in part in the description which follows and, in part, will be apparent from the description.

According to an aspect of an example embodiment, a method of stabilizing a video includes: acquiring a plurality of frames using an image signal received from an image sensor; receiving an input requesting enlargement at a magnification in relation to the plurality of frames; acquiring shaking information of the plurality of frames using information on at least one of: movement of a subject included in the plurality of frames and movement of an electronic device; determining shaking compensation areas corresponding to the respective plurality of frames in entire areas of the respective plurality of frames based on the shaking information of the plurality of frames and information of the magnification; generating output frames corresponding to the respective plurality of frames by enlarging the shaking compensation areas at the magnification; and providing a video including the output frames.

Acquiring the plurality of frames may, for example, include acquiring frames having a maximum angle of view obtained by the electronic device.

Receiving the input may, for example, include: receiving a pinch input through a touch screen on which a preview image is displayed; and determining the magnification and an initial zoom area based on the pinch input.

Acquiring the shaking information of the plurality of frames may, for example, include: acquiring first movement information of the movement of the subject included in the plurality of frames based on comparing the plurality of frames; acquiring second movement information of the movement of the electronic device corresponding to duration of acquisition of the plurality of frames using at least one sensor included in the electronic device; and acquiring the shaking information of the plurality of frames using at least one of the first movement information and the second movement information.

Determining the shaking compensation areas corresponding to the respective plurality of frames may, for example, include: determining a stabilization path opposed to the movement of the electronic device or corresponding to the movement of the subject based on the shaking information; and determining the shaking compensation areas corresponding to the respective plurality of frames based on the stabilization path.

Determining the stabilization path may, for example, include determining the stabilization path based at least in part on resolution information of the plurality of frames.

Generating the output frames may, for example, include correcting rolling shutter distortion of at least one of the plurality of frames based on motion vectors of the plurality of frames.

Generating the output frames corresponding to the respective plurality of frames may, for example, include compensating for rotation in at least one of the plurality of frames based on rotational component information included in the shaking information.

Compensating for the rotation in the at least one frame may, for example, include: translating a first shaking compensation area of a first frame among the plurality of frames to a central area of the first frame; rotating the first shaking compensation area by an angle; and translating the rotated first shaking compensation area to the central area of the first frame.

The method according to an example may further include: providing a selection window for selecting a first stabilization method including determining a shaking compensation area in a cropping area of an input frame or a second stabilization method including determining a shaking compensation area in an entire area of an input frame; and generating the video based on the method selected through the selection window.

The method according to an example may further include: providing a graphical user interface (GUI) including a first play button corresponding to a first video generated by the first stabilization method and a second play button corresponding to a second video generated by the second stabilization method; and playing one of the first video and the second video based on a selection of one of the first play button and the second play button.

According to an aspect of another example embodiment, an electronic device includes: a UI configured to receive an input requesting enlargement at a magnification in relation to a plurality of frames received from an image sensor; a controller configured to acquire shaking information of the plurality of frames using information of movement of a subject included in the plurality of frames or movement of the electronic device, to determine shaking compensation areas corresponding to the respective plurality of frames in entire areas of the respective plurality of frames based on the shaking information of the plurality of frames and information of the magnification, and to generate output frames corresponding to the respective plurality of frames by enlarging the shaking compensation areas at the magnification; and an output unit including a display configured to display a video including the output frames.

Angles of view of the respective plurality of frames may, for example, be wider than angles of view of the respective output frames.

The UI of the electronic device may, for example, be configured to receive a pinch input through a touch screen on which a preview image is displayed, and to determine the magnification and an initial zoom area based on the pinch input.

The controller of the electronic device may, for example, be configured to acquire first movement information of the movement of the subject included in the plurality of frames based on results of comparing the plurality of frames, to acquire second movement information of the movement of the electronic device corresponding to duration of acquisition of the plurality of frames using at least one sensor included in the electronic device, and to acquire the shaking information of the plurality of frames using at least one of the first movement information and the second movement information.

The controller of the electronic device may, for example, be configured to determine a stabilization path opposed to the movement of the electronic device or corresponding to the movement of the subject based on the shaking information, and to determine the shaking compensation areas corresponding to the respective plurality of frames based on the stabilization path.

The controller of the electronic device may, for example, be configured to determine the stabilization path based at least in part on resolution information of the plurality of frames.

The controller of the electronic device may, for example, be configured to correct rolling shutter distortion of at least one of the plurality of frames based on motion vectors of the plurality of frames.

The controller of the electronic device according to an example may compensate for rotation in at least one of the plurality of frames based on rotational component information included in the shaking information.

BRIEF DESCRIPTION OF THE DRAWINGS

These and/or other aspects will become more apparent and more readily appreciated from the following detailed description, taken in conjunction with the accompanying drawings, in which like reference numerals refer to like elements, and wherein:

FIGS. 3A and 3B are diagrams illustrating an example operation of an electronic device stabilizing a video using the first stabilization method;

FIG. 6 includes diagrams illustrating an example magnification (magnifying power) of a video;

FIGS. 7A and 7B are diagrams illustrating an example operation of an electronic device stabilizing a video using the second stabilization method;

FIGS. 8A to 8G are diagrams illustrating an example operation of an electronic device stabilizing a plurality of frames using a stabilization path;

FIGS. 14 and 15 are diagrams illustrating an example operation of an electronic device providing a selection window for selecting a stabilization method;

FIGS. 17 and 18 illustrate example graphical user interfaces (GUIs) for providing a plurality of videos generated by an electronic device using a plurality of example stabilization methods;

DETAILED DESCRIPTION

Figure 1:
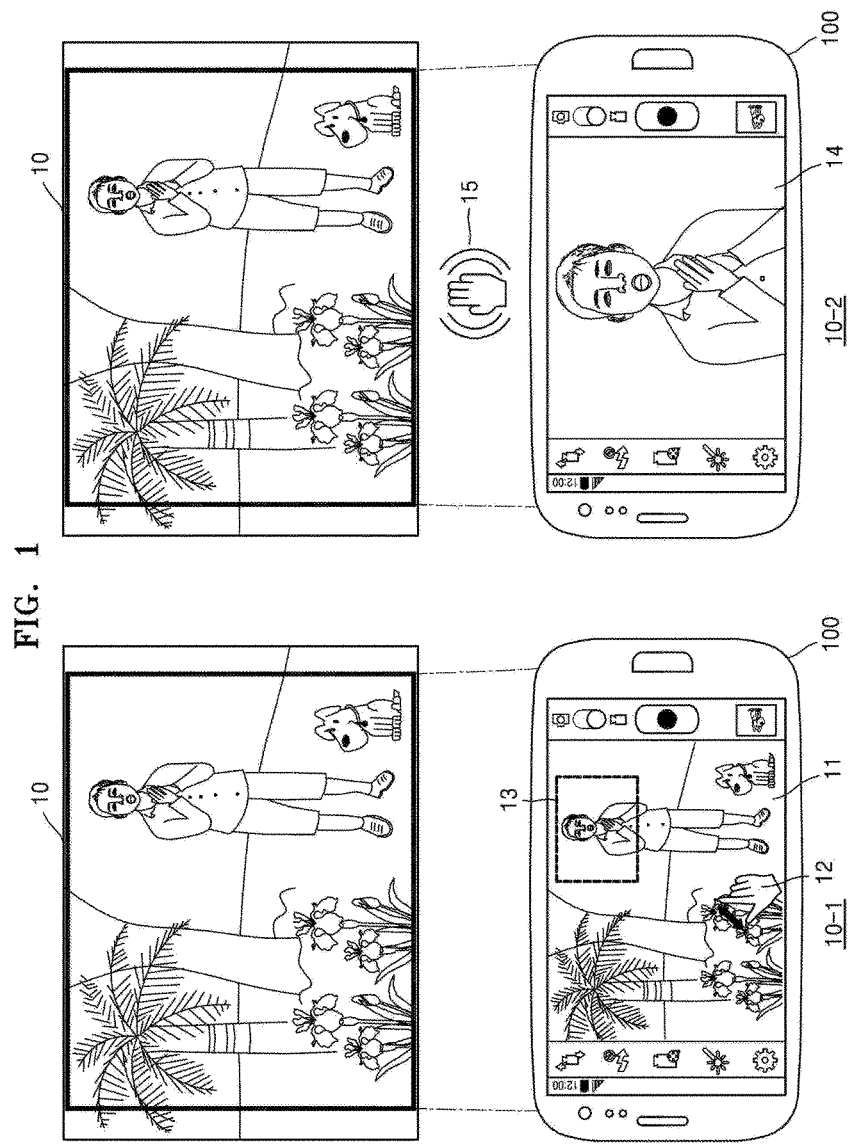
FIG. 1 includes diagrams illustrating an example system for capturing a video.

Terminology used in this disclosure will be described in brief, and then examples of the disclosure will be described in greater detail.

As terminology used in this disclosure, general terms currently in wide use are selected wherever possible in consideration of functions in the disclosure, but may vary according to intentions of those of ordinary skill in the art, the advent of new technology, and so on. For example, some terms may be arbitrarily selected by the applicant, and in such cases, the meanings of the terms will generally be stated in the corresponding description. Therefore, the terms used in this disclosure should be defined based on the meanings of the terms together with the description throughout the disclosure and not necessarily by their simple names.

Throughout the disclosure, when a portion "includes" an element, unless otherwise described, another element may be further included, rather than the presence of other elements being excluded. Also, terms such as "unit" and "module" used herein indicate a unit for processing at least one function or operation, in which the unit and the block may be embodied as hardware, e.g., circuitry, or software or may be embodied by a combination of hardware and software.

In this disclosure, the term "digital zoom" may, for example, denote or refer to an operation of enlarging a subject by reducing the angle of view of a digital photograph or a digital video, unlike optical zoom in which a subject may be enlarged by adjusting the focal length of a lens.

In this disclosure, the term "digital zoom video" may, for example, denote or refer to a video which includes output frames having a narrower angle of view than the original frames. The original frames may, for example, denote frames (referred to as input frames below) which are input through or received from an image sensor and have an angle of view.

In this disclosure, the phrase "stabilization of a digital zoom video" may, for example, denote or refer to an image processing technique for electronically compensating for shaking of a digital zoom video caused by movement of a cameraman or a subject so that the digital zoom video may be smoothly played for example as if captured using a tripod or rails.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are described below with reference to the figures merely to explain aspects. As used herein, the term "and/or" includes any and all combinations of one or more of the associated listed items. Expressions such as "at least one of," when preceding a list of elements, modify the entire list of elements and do not necessarily modify the individual elements of the list.

FIG. 1 includes diagrams illustrating an example system for capturing a video.

Referring to FIG. 1, an example system for capturing a video may, for example, include an electronic device 100. The electronic device 100 may, for example, denote or refer to equipment which acquires a plurality of frames of a subject and generates a video using the plurality of acquired frames.

The electronic device 100 may, for example, be implemented in various forms. For example, the electronic device 100 may include a digital camera, a smart phone, a laptop computer, a tablet PC, an electronic (e)-book terminal, a digital broadcast terminal, a personal digital assistant (PDA), a portable multimedia player (PMP), a navigation device, an MP3 player, etc., but is not limited thereto. The electronic device 100 described in this disclosure may, for example, be a device wearable by a user. The wearable device may, for example, include at least one of an accessory-type device (e.g., a watch, a ring, a bracelet, an anklet, a necklace, glasses, or a contact lens), a head-mounted device (HMD), a device integrated with fabric or clothing (e.g., electronic clothing), a device attached to a human body (e.g., a skin pad), and a bio-implantable device (e.g., an implantable circuit).

For convenience of description, an example in which the electronic device 100 is a smart phone having a built-in digital camera or a built-in camera will be described below.

According to an example, the electronic device 100 may, for example, provide a digital zoom function. For example, the electronic device 100 may generate output frames obtained by enlarging partial areas of original frames, and generate a digital zoom video by combining the output frames. According to an example, the electronic device may, for example, change the angles of view of original frames before, during, or after capturing of a video.

The original frames may be input frames having a previously set angle of view. The previously set angle of view may, for example, include the maximum angle of view which is supportable by the electronic device 100.

Referring to 10-1 of FIG. 1, the electronic device 100 may display a preview image 11 of an original frame 10 on, for example, a touch screen. The electronic device 100 may receive a zoom input 12 for narrowing the angle of view of the original frame 10 through the touch screen. For example, the electronic device 100 may receive a pinch input 12 on the preview image 11.

In this disclosure, the term "pinch" may, for example, refer to a motion of moving two fingers in different directions while keeping the fingers in contact with a screen. A pinch may, for example, be a gesture for enlarging (pinch open) or reducing (pinch close) an object, and an enlargement value or a reduction value may be determined based, for example, on the distance between the two fingers.

According to an example, the electronic device 100 may determine a magnifying power (magnification) based on the zoom input 12. For example, the electronic device 100 may determine a magnifying power to be '2.5×.' Also, the electronic device 100 may determine an area 13 that a user wants to enlarge (referred to as a region of interest (ROI) below) in the original frame 10.

Referring to 10-2 of FIG. 1, the electronic device 100 may display a preview image 14 obtained by enlarging the ROI 13 by a factor of 2.5. According to an example, the user may check the preview image 14 and translate or rotate the electronic device 100 so that an image desired to be captured is shown in the touch screen. The electronic device 100 may generate a digital zoom video by combining frames having the angle of view corresponding to a magnifying power (e.g., 2.5×) set by the zoom input 12.

Figure 2:
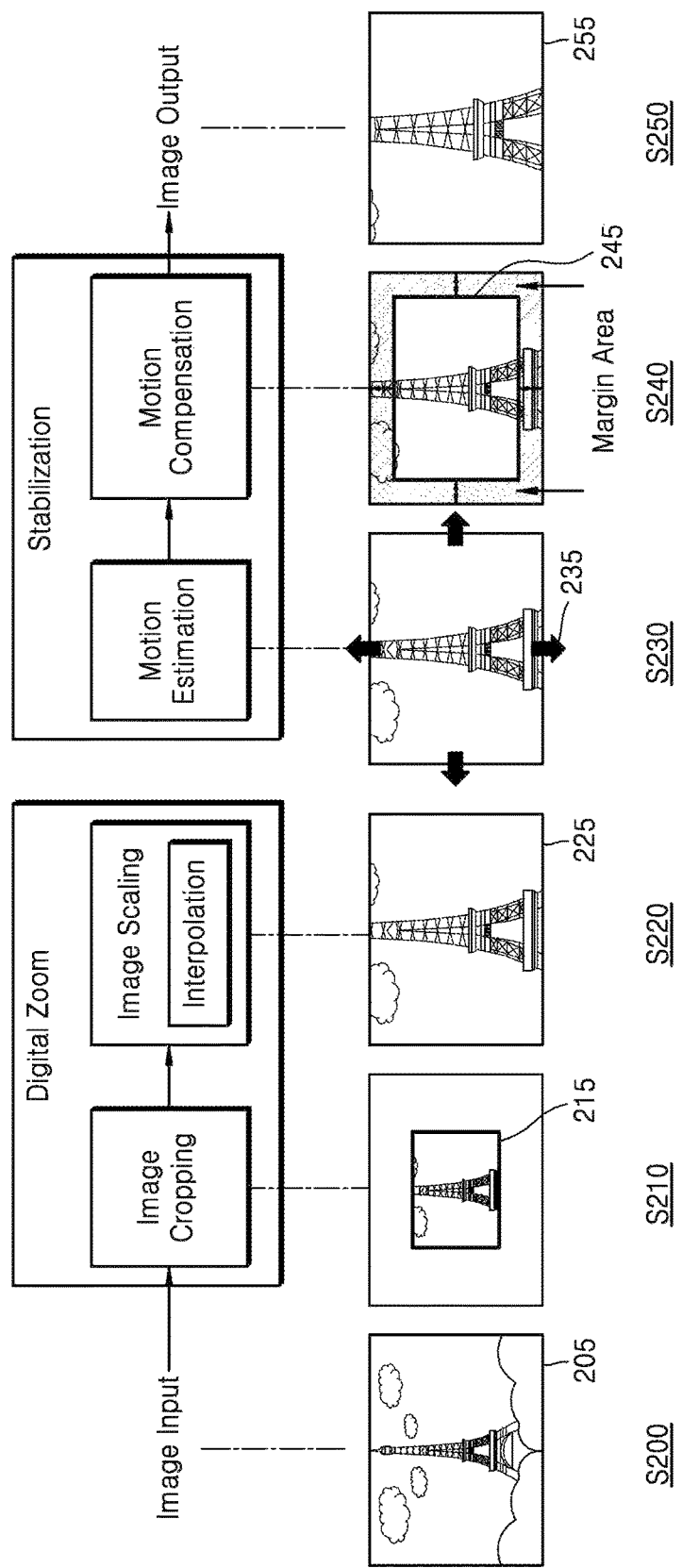
FIG. 2 is a diagram illustrating an example first stabilization method using a partial area of an input frame as an area in which it is possible to compensate for shaking.

If, for example, hand tremors 15 occur while the electronic device 100 captures the digital zoom video, shaking scenes may be displayed when the digital zoom video is played. Therefore, when generating the digital zoom video, the electronic device 100 may perform a video stabilization process to compensate for the hand tremors 15. Referring to FIG. 2, a technology for stabilizing a digital zoom video will be described.

FIG. 2 is a diagram illustrating an example first stabilization method using a partial area of an input frame as an area in which it is possible to compensate for shaking.

In operation S200, the electronic device 100 may, for example, receive an input frame 205 having an angle of view. For example, the electronic device 100 may receive the input frame 205 having the maximum angle of view.

In operation S210, the electronic device 100 may crop a partial area 215 of the input frame 205 based on a zoom input. For example, when a magnifying power (magnification) is '2×,' the electronic device 100 may crop an area which is half the input frame 205 in size based on the center of the input frame 205. In this disclosure, cropping may, for example, denote or refer to an operation of cutting off an area other than the selected partial area 215. For convenience of description, an area remaining after an image cropping process will be referred to as "cropping area" below.

In operation S220, the electronic device 100 may enlarge the partial area 215 to the size of the input frame 205. For example, when the magnifying power (magnification) is '2×,' the electronic device 100 may obtain an enlarged image 225 which is double the partial area 215 in length and width using, for example, a pixel interpolation technique.

In operation S230, the electronic device 100 may acquire motion information 235 of the input frame 205 using the enlarged image 225. For example, the electronic device 100 may measure translation of a subject by comparing an enlarged image of a previous input frame and the enlarged image 225 of the current input frame 205. Also, the electronic device 100 may, for example, measure motion of the electronic device 100 using at least one sensor (e.g., an acceleration sensor and a gyro sensor).

In operation S240, the electronic device 100 may determine an output area 245 in the enlarged image 225 based at least in part on a margin area. For example, when the margin area is 10%, the electronic device 100 may determine 90% of the enlarged image 225 as the output area 245.

The electronic device 100 may adjust the position of the output area 245 in the enlarged image 225 based at least in part on the motion information 235. For example, when the subject has been translated to the lower left in the enlarged image 225 of the current input frame 205 in comparison with the enlarged image of the previous input frame, the electronic device 100 may adjust the position of the output area 245 to the lower left area of the enlarged image 225.

A range in which the electronic device 100 may adjust the position of the output area 245 within the enlarged image 225 to compensate for shaking may be the range of the margin area. For example, when the margin area is 10% of the enlarged image 225, the range in which the electronic device 100 may adjust the position of the output area 245 to compensate for shaking may be 10% of the enlarged image 225. According to an example, when the electronic device 100 adjusts the position of the output area 245 to compensate for shaking, the output area 245 at the adjusted position may be expressed as a shaking compensation area.

In operation S250, the electronic device 100 may, for example, generate an output frame 255 using the output area 245. For example, the electronic device 100 may generate the output frame 255 by enlarging the output area 245 based on an output size.

As described above, according to the first stabilization method, the electronic device 100 uses the enlarged image 225 which is obtained by enlarging the partial area (cropping area) 215 subjected to the cropping process in the input frame 205 for motion estimation, and thus a measured motion value may be inaccurate.

Also, according to the first stabilization method, the electronic device 100 first performs a cropping operation on the partial area 215 which is the cropping area of the input frame 205, and determines a shaking compensation area in the enlarged image 225 obtained by enlarging the partial area (cropping area) 215. Therefore, the range of an area in which it is possible to compensate for shaking may be limited to the margin area (the gap between the enlarged image 225 and the output area 245).

Figure 3A:
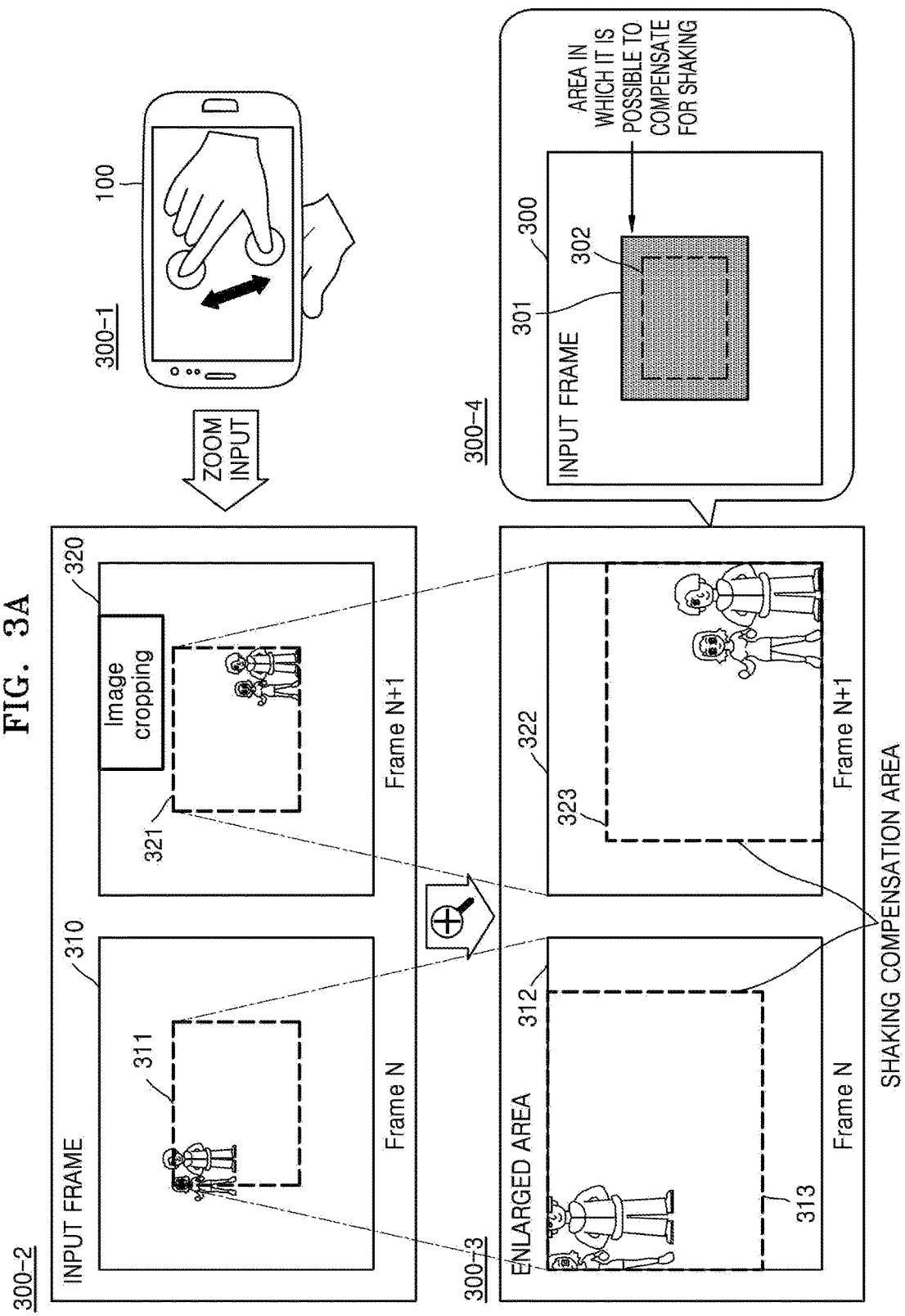

Referring to FIGS. 3A and 3B, the first stabilization method will be described in further detail.

FIGS. 3A and 3B are diagrams illustrating an example operation of an electronic device stabilizing a video using the first stabilization method.

Referring to 300-1 of FIG. 3A, the electronic device 100 may receive a zoom input. The zoom input may, for example, be an input requesting digital zoom for enlarging a partial area of an input frame at a magnification by reducing the angle of view. 300-1 of FIG. 3A illustrates an example in which the zoom input is a pinch input, but the zoom input is not limited thereto. For example, the zoom input may be a touch input (e.g., a double tap and dragging) other than a pinch, a voice input, or an input using a hardware button, but is not limited thereto.

Referring to 300-2 of FIG. 3A, the electronic device 100 may determine a magnifying power (magnification) based on the zoom input. The electronic device 100 may determine a cropping area based on the determined magnifying power. For example, when the magnifying power is '2×,' the size of the cropping area may be half that of the input frame. The center of the cropping area may, for example, correspond to the center of the input frame.

The electronic device 100 may perform an image cropping operation on each of a plurality of input frames. For example, the electronic device 100 may determine a first cropping area 311 in an N-th input frame 310 based on the zoom input. Also, the electronic device 100 may determine a second cropping area 321 in an (N+1)th input frame 320.

When hand tremors occur during capturing of the N-th input frame 310 and the (N+1)th input frame 320, each of the first cropping area 311 and the second cropping area 321 may differ from an ROI. The ROI may, for example, denote or refer to an area including an image that the user wants to be output in an original frame. For example, the ROI may be an area at the center of which a subject is positioned.

When hand tremors are severe, a part or all of the subject may deviate from the cropping area, as in the first cropping area 311 corresponding to the N-th input frame 310.

Referring to 300-3 of FIG. 3A, the electronic device 100 may enlarge the first cropping area 311 and the second cropping area 321 at the magnification. For example, the electronic device 100 may enlarge the first cropping area 311 to the same size as the N-th input frame 310 and interpolate the enlarged first cropping area 311, thereby generating a first enlarged image 312. Also, the electronic device 100 may enlarge the second cropping area 321 to the same size as the (N+1)th input frame 320 and interpolate the enlarged second cropping area 321, thereby generating a second enlarged image 322.

According to an example, the electronic device 100 may determine a first shaking compensation area 313 for compensating for shaking of the N-th input frame 310 in the first enlarged image 312. Also, the electronic device 100 may determine a second shaking compensation area 323 for compensating for shaking of the (N+1)th input frame 320 in the second enlarged image 322.

Referring to 300-4 of FIG. 3A, according to the first stabilization method, the electronic device 100 crops a partial area 301 from an input frame 300 and then compensates for shaking. Therefore, the partial area 301 cropped from the input frame 300 may be an area in which it is possible to compensate for shaking. According to the first stabilization method, it is not possible to compensate for shaking outside the cropped partial area 301, and a shaking compensation area 302 may be determined in the cropped partial area 301.

Referring to 300-5 of FIG. 3B, when the subject in the N-th input frame 310 is translated to the upper left due to hand tremors in comparison with the subject in an initial input frame, the electronic device 100 may determine the first shaking compensation area 313 by translating an initial shaking compensation area 303 to the upper left based on motion information.

Also, when the subject in the (N+1)th input frame 320 is translated to the lower right due to hand tremors in comparison with the subject in the initial input frame, the electronic device 100 may determine the second shaking compensation area 323 by translating the initial shaking compensation area 303 to the lower right based on motion information.

Referring to 300-6 of FIG. 3B, the electronic device 100 may generate an N-th output frame 314 corresponding to the N-th input frame 310 by enlarging the first shaking compensation area 313 to an output size. Also, the electronic device 100 may generate an (N+1)th output frame 324 corresponding to the (N+1)th input frame 320 by enlarging the second shaking compensation area 323 to the output size. In addition, the electronic device 100 may generate a digital zoom video based on the first stabilization method by combining the N-th output frame 314 and the (N+1)th output frame 324.

Referring to 300-7 of FIG. 3B, when the N-th output frame 314 and the (N+1)th output frame 324 overlap each other, a motion difference 330 between the subject of the N-th output frame 314 and the subject of the (N+1)th output frame 324 may be apparent. For example, according to the first stabilization method, the partial area 301 is cropped from the input frame 300, and then shaking compensation is performed only in the cropped partial area 301, and therefore shaking compensation may be insufficient.

For this reason, a second stabilization method which shows higher efficiency in margin use for shaking compensation than the first stabilization method will be described below. The second stabilization method may be a technique for compensating for shaking in the entire area of an input frame. For convenience of description, the first stabilization method may be referred to as "crop zoom digital image stabilization (DIS)," and the second stabilization method may be referred to as "full zoom DIS."

Figure 4:
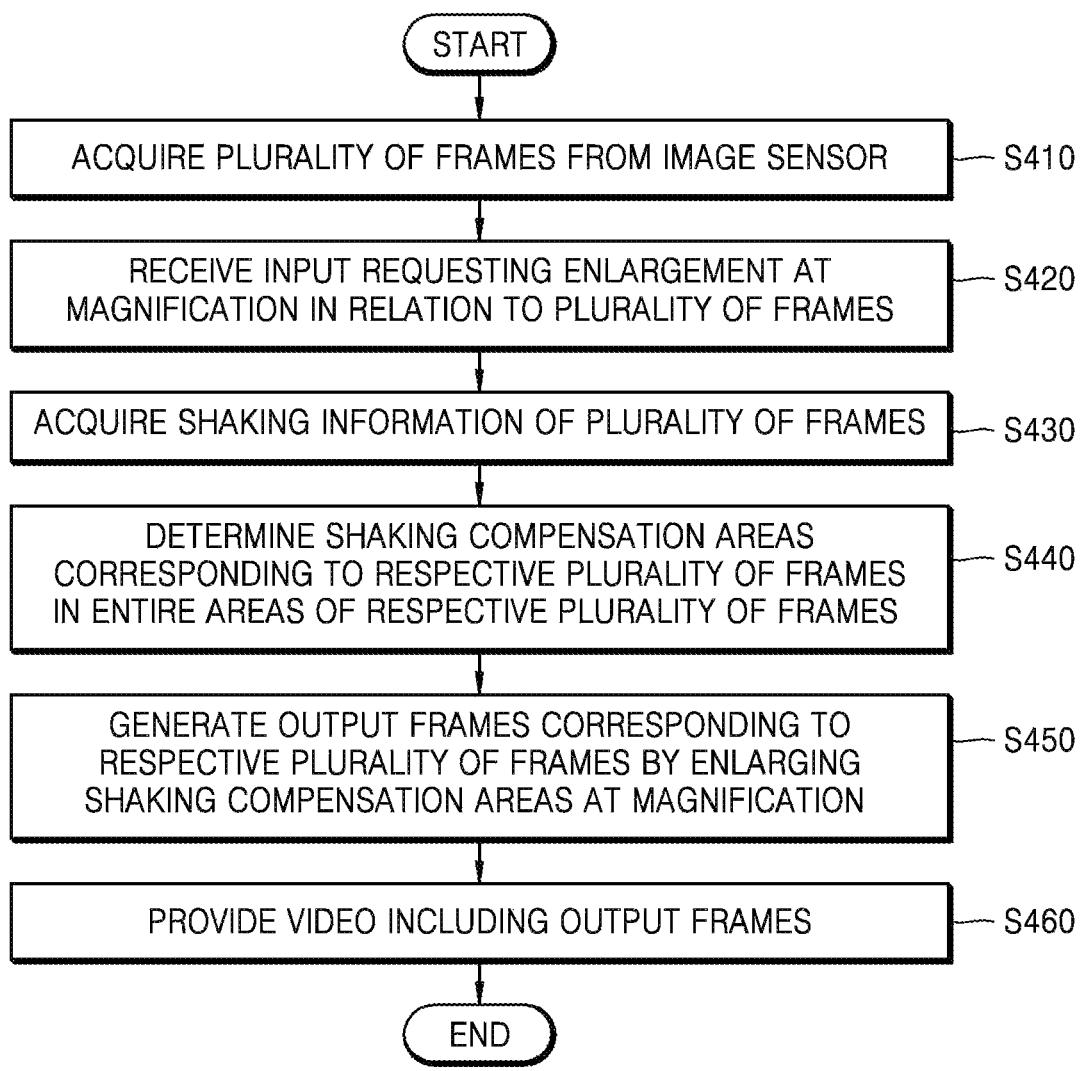
FIG. 4 is a flowchart illustrating an example method in which an electronic device stabilizes a video.

FIG. 4 is a flowchart illustrating an example method in which an electronic device stabilizes a video.

In operation S410, the electronic device 100 may acquire a plurality of frames through or from the image sensor. For example, the electronic device 100 may acquire a plurality of original frames using an image signal input through the image sensor. At this time, the electronic device 100 may, for example, acquire original frames having a previously set angle of view or original frames having the maximum angle of view.

In operation S420, the electronic device 100 may receive an input (for convenience, referred to as "zoom input" below) requesting enlargement at a magnification in relation to the plurality of frames. According to an example, the electronic device 100 may receive a zoom input for narrowing the angle of view of the original frames through the touch screen. For example, the electronic device 100 may receive a pinch input of spreading two fingers away from each other on a preview image.

According to an example, the zoom input requesting enlargement at the magnification in relation to the plurality of frames may be diverse. For example, the zoom input may be a voice input including voice for requesting enlargement at the magnification or an input of pressing a hardware button. Also, when the electronic device 100 is a flexible device, the zoom input may, for example, include an input of bending an area of the electronic device 100. However, the zoom input is not limited to those mentioned above.

According to an example, the electronic device 100 may determine a magnifying power (magnification) based on the zoom input. For example, the electronic device 100 may determine the magnifying power based on a ratio of the resolution of an original frame to the resolution of the preview image displayed on a display of the electronic device 100. For example, when a half area of the original frame is displayed as a preview image, the electronic device 100 may determine a magnifying power to be '2×.' The magnifying power may be changed based on an input. The electronic device 100 may use information on the magnifying power determined based on the zoom input to generate a stabilization path or an output frame.

According to an example, the electronic device 100 may determine an initial zoom area in the original frame based on the zoom input. The initial zoom area may be an ROI that the user wants to be substantially output in the original frame.

For example, the electronic device 100 may determine an area of the original image corresponding to the preview image displayed on the display as the initial zoom area. The size of the initial zoom area may be in inverse proportion to the magnifying power. For example, when the magnifying power is 2×, the size of the initial zoom area may be half that of the original frame.

According to an example, the electronic device 100 may receive a zoom input for changing the angle of view of original frames before or during capturing of a video.

In operation S430, the electronic device 100 may acquire shaking information of the plurality of frames. The shaking information may, for example, denote or refer to information on hand tremors or movement of a subject which occurs during capturing of a video. The shaking information may, for example, include translation component information and/or rotational component information. The translation component information may, for example, include information (e.g., a motion vector) related to translation coordinates, and the rotational component information may, for example, include information on an angle of rotation or inclination.

According to an example, the electronic device 100 may acquire the shaking information of the plurality of frames using the movement of the subject included in the plurality of frames and/or information on movement of the electronic device 100.

For example, the electronic device 100 may acquire first movement information (e.g., a motion vector) of the movement of the subject or the background based on results of comparing the plurality of original frames. The electronic device 100 may acquire first movement information using, for example, a block-based method, an optical estimation method, or so on. The block-based method may, for example, be a method of searching blocks of a second frame for a block which has the most similar image data to a block of a first frame and calculating a motion vector of the second frame.

According to an example, the electronic device 100 may calculate a motion vector in the entire area or a partial area of an original frame. For example, when hand tremors occur, the entire screen moves in a direction, and thus it may be necessary to accurately determine a global motion vector.

While acquiring the plurality of frames, the electronic device 100 may acquire second movement information about the movement of the electronic device 100 using at least one sensor included in the electronic device 100. For example, the electronic device 100 may acquire the second movement information about the movement of the electronic device 100 using information measured by a motion sensor, such as an acceleration sensor or a gyro sensor.

According to an example, the electronic device 100 may acquire the shaking information of the plurality of frames using at least one of the first movement information and the second movement information. For example, the electronic device 100 may use 1) the first movement information acquired by comparing the original frames, 2) the second movement information acquired based on a value measured by the motion sensor included in the electronic device 100, or 3) a combination of the first movement information and the second movement information as the shaking information.

In operation S440, the electronic device 100 may determine shaking compensation areas corresponding to the respective plurality of frames in the entire areas of the respective plurality of frames.

According to an example, the electronic device 100 may determine the shaking compensation areas in entire areas of the respective plurality of frames based on the shaking information of the plurality of frames and information on the magnification.

The shaking compensation areas may be areas in which the position of the initial zoom area is reset based on the shaking information. For example, when the subject has not moved but the electronic device 100 has been shaken to the left, the electronic device 100 may translate the initial zoom area to the right. The initial zoom area translated to the right may be a shaking compensation area. Therefore, the size of the shaking compensation area may be the same as or similar to the size of an initial zoom area determined based on the magnification.

The electronic device 100 may determine the shaking compensation areas by translating the position of the initial zoom area in the entire areas of the original frames, and thus a range in which it is possible to compensate for shaking may be wider than that when shaking compensation areas are determined within only cropping areas of original frames.

According to an example, the electronic device 100 may determine a stabilization path in opposition or opposed to the movement of the electronic device 100 or corresponding to the movement of the subject based on the shaking information. The electronic device 100 may determine the shaking compensation areas corresponding to the respective plurality of frames based on the stabilization path. The stabilization path may, for example, denote or refer to a reference trajectory for compensating for shaking.

According to an example, the electronic device 100 may determine the stabilization path based at least in part on resolution information of the original frames. For example, the electronic device 100 may determine the stabilization path based on the resolution of the original frames and the sizes of the shaking compensation areas so that the shaking compensation areas do not deviate from the original frames.

Determination of a stabilization path may also be referred to as camera path planning below. Camera path planning will be described in greater detail below with reference to FIGS. 8A to 8G.

According to an example, the electronic device 100 may compensate for rotation in at least one of the plurality of frames based on rotational component information included in the shaking information. For example, the electronic device 100 may translate a first shaking compensation area of the first frame among the plurality of frames to the central area of the first frame, and rotate the first shaking compensation area by an angle. The electronic device 100 may translate the rotated first shaking compensation area to the central area of the first frame again. Operation of the electronic device 100 compensating for rotation will be described in greater detail below with reference to FIG. 9.

According to an example, the electronic device 100 may correct rolling shutter distortion of at least one of the plurality of frames based on motion vectors of the plurality of frames. Operation of correcting rolling shutter distortion will be described in greater detail below with reference to FIG. 12.

In operation S450, the electronic device 100 may generate output frames corresponding to the respective plurality of frames by enlarging the shaking compensation areas at a magnification. The angles of view of the respective output frames may be narrower than the angles of view of the input frames (original frames).

In operation S460, the electronic device 100 may provide a video including the output frames. For example, the electronic device 100 may generate a digital zoom video by combining the output frames and provide the digital zoom video.

Provision of the video may include display of an icon, a thumbnail image, an initial frame, etc. on the screen, playing of the video, transmission of the video to a server, or so on.

According to an example, the electronic device 100 may store the generated digital zoom video in an internal memory or an external storage medium (e.g., a Secure Digital (SD) card). Also, the electronic device 100 may transmit the digital zoom video to a cloud server or a social networking service (SNS) server linked to the electronic device 100.

According to an example, the electronic device 100 may play the digital zoom video at the user's request.

An example of compensating for shaking using the second stabilization method will be described below with reference to FIG. 5.

Figure 5:
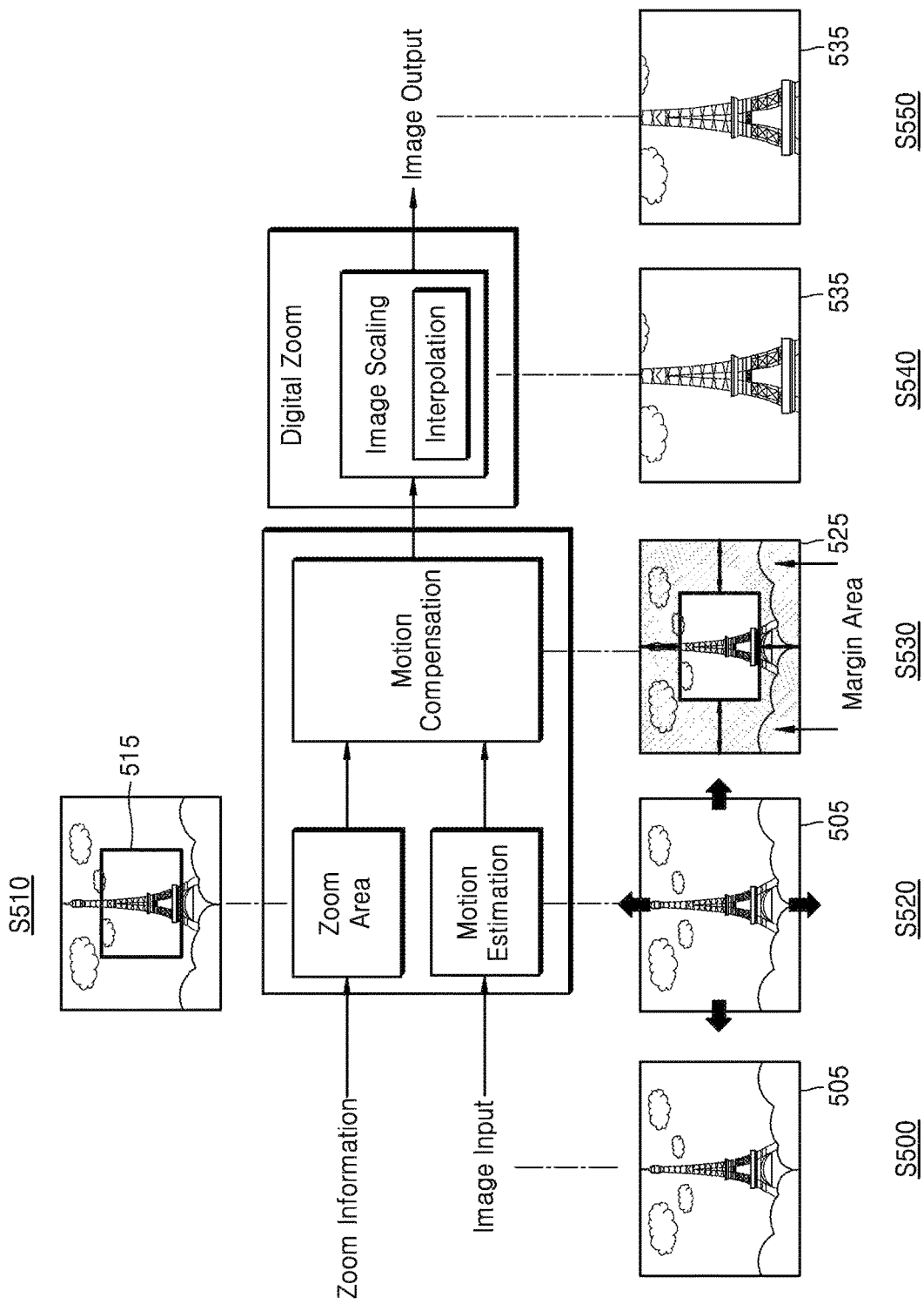
FIG. 5 is a diagram illustrating an example second stabilization method using the entire area of an input frame as an area in which it is possible to compensate for shaking.

FIG. 5 is a diagram illustrating an example of the second stabilization method of using the entire area of an input frame as an area in which it is possible to compensate for shaking.

In operation S500, the electronic device 100 may receive an input frame 505 having an angle of view. For example, the electronic device 100 may receive the input frame 505 having the maximum angle of view.

In operation S510, the electronic device 100 may receive a zoom input, and determine a magnifying power (magnification) and an initial zoom area 515 based on the zoom input. For example, when the magnifying power (magnification) is '2×,' the electronic device 100 may determine an area which is half the input frame 505 in size based on the center of the input frame 505 as the initial zoom area 515.

In operation S520, the electronic device 100 may acquire motion information of the input frame 505 using the input frame 505. For example, the electronic device 100 may measure translation of a subject by comparing a previous input frame and the current input frame 505. Also, the electronic device 100 may measure motion of the electronic device 100 using at least one sensor (e.g., an acceleration sensor, a gyro sensor, etc.).

In operation S530, the electronic device 100 may determine a shaking compensation area 525 in the entire area of the input frame 505 based at least in part on the motion information. For example, the electronic device 100 may determine the shaking compensation area 525 by translating the initial zoom area 515 in the opposite direction to the movement of the electronic device 100.

A margin area in which it is possible to compensate for shaking may, for example, be an area obtained by removing the initial zoom area 515 from the entire area of the input frame 505. Therefore, by comparing S530 of FIG. 5 with S240 of FIG. 2, it is apparent that a margin area based on the second stabilization method is much larger than a margin area based on the first stabilization method.

In operation S540, the electronic device 100 may enlarge the shaking compensation area 525 at a magnification based on an output size as the N-th input frame and interpolate the enlarged first cropping area 515, thereby generating an output frame 535.

In operation S550, the electronic device 100 may output the output frame 535.

According to the second stabilization method, the electronic device 100 may translate the position of an initial zoom area in the entire area of an original frame to determine a shaking compensation area. Therefore, compared with the first stabilization method of determining a shaking compensation area only in a cropping area of the original frame, it is possible to compensate for shaking to a greater extent.

FIG. 6 includes diagrams illustrating a magnification (magnifying power) of a video.

Referring to 610 of FIG. 6, when a magnification based on a zoom input (referred to as a zoom magnification below) is '1.5×,' the electronic device 100 may set an area which is two thirds of an input frame 600 in length and width based on the center of an input frame 600 as a first initial zoom area 611. A first preview image 612 displayed on the display of the electronic device 100 may be an image obtained by enlarging the first initial zoom area 611 by a factor of 1.5 in length and width.

Referring to 620 of FIG. 6, when a zoom magnification is '2.5×,' the electronic device 100 may set an area which is two fifths of the input frame 600 in length and width based on the center of an input frame 600 as a second initial zoom area 621. A second preview image 622 displayed on the display of the electronic device 100 may be an image obtained by enlarging the second initial zoom area 621 by a factor of 2.5 in length and width.

Referring to 630 of FIG. 6, when a zoom magnification is '4×,' the electronic device 100 may set an area which is a quarter of the input frame 600 in length and width based on the center of an input frame 600 as a third initial zoom area 631. A third preview image 632 displayed on the display of the electronic device 100 may be an image obtained by enlarging the third initial zoom area 631 by a factor of four in length and width.

Therefore, a zoom magnification may become lower for a larger initial zoom area set by a zoom input of the user, and the zoom magnification may become higher for a smaller initial zoom area.

Figure 7A:
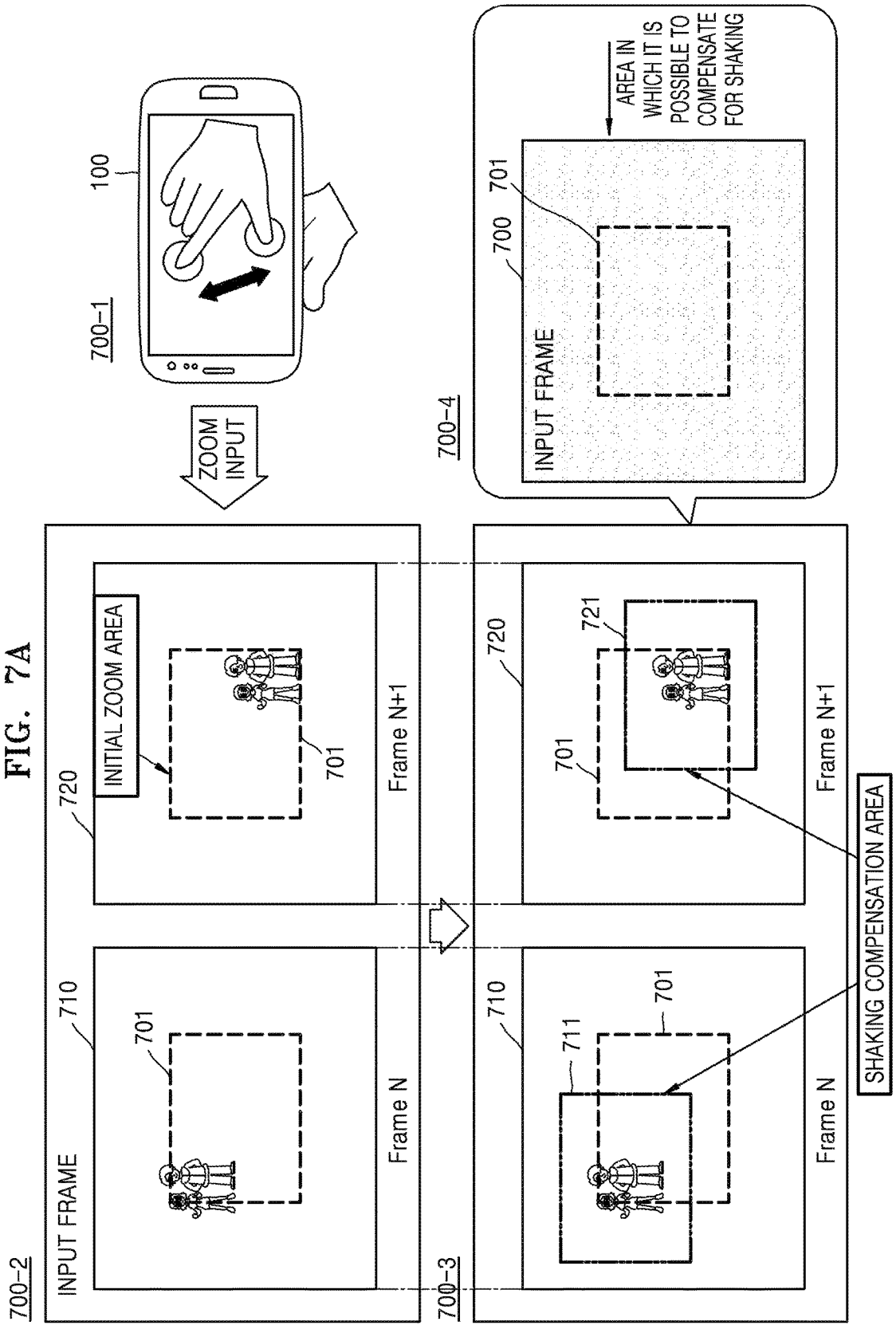

FIGS. 7A and 7B include diagrams illustrating an operation of an electronic device stabilizing a video using the second stabilization method.

Referring to 700-1 of FIG. 7A, the electronic device 100 may receive a zoom input. Here, the zoom input may be an input requesting digital zoom for enlarging a partial area of an input frame at a magnification by reducing the angle of view. 700-1 of FIG. 7A shows an example in which the zoom input is a pinch input, but the zoom input is not limited thereto.

Referring to 700-2 of FIG. 7A, the electronic device 100 may determine a magnifying power (magnification) and an initial zoom area 701 based on a zoom input. For example, when the magnifying power is '2×,' the size of the initial zoom area 701 may be half that of the input frame.

Referring to 700-3 of FIG. 7A, when hand tremors occur during capturing of an N-th input frame 710 and an (N+1)th input frame 720, the electronic device 100 may determine a first shaking compensation area 711 in the entire area of the N-th input frame 710 and determine a second shaking compensation area 721 in the entire area of the (N+1)th input frame 720, based on shaking information.

Referring to 700-4 of FIG. 7A, based on the second stabilization method, the electronic device 100 determines a shaking compensation area in the entire area of an input frame 700, and thus the entire area of the input frame 700 may be an area in which it is possible to compensate for shaking. Referring to 300-4 of FIG. 3A, based on the first stabilization method, the shaking compensation area 302 is determined in the cropped partial area 301. Therefore, an area in which it is possible to compensate for shaking based on the second stabilization method is much larger than an area in which it is possible to compensate for shaking based on the first stabilization method.

Referring to 700-5 of FIG. 7B, when the subject in the N-th input frame 710 is translated to the upper left due to hand tremors in comparison with the subject in an initial input frame, the electronic device 100 may determine the first shaking compensation area 711 by translating the initial zoom area 701 to the upper left.

Also, when the subject in the (N+1)th input frame 720 is translated to the lower right due to hand tremors in comparison with the subject in the initial input frame, the electronic device 100 may determine the second shaking compensation area 721 by translating the initial zoom area 701 to the lower right.

Referring to 700-6 of FIG. 7B, the electronic device 100 may generate an N-th output frame 712 corresponding to the N-th input frame 710 by enlarging the first shaking compensation area 711 to an output size. Also, the electronic device 100 may generate an (N+1)th output frame 722 corresponding to the (N+1)th input frame 720 by enlarging the second shaking compensation area 721 to the output size. In addition, the electronic device 100 may generate a digital zoom video based on the second stabilization method by combining the N-th output frame 712 and the (N+1)th output frame 722.

Referring to 700-7 of FIG. 7B, when the N-th output frame 712 and the (N+1)th output frame 722 overlap each other, there is almost no motion difference between the subject of the N-th output frame 712 and the subject of the (N+1)th output frame 722. Therefore, when the digital zoom video based on the second stabilization method is played, the user may hardly feel shaking of the digital zoom video.

A method in which the electronic device 100 compensates for shaking according to a stabilization path will be described in detail below with reference to FIGS. 8A to 8G.

FIGS. 8A to 8G includes diagrams illustrating an example operation of an electronic device stabilizing a plurality of frames using a stabilization path.

Figure 8A:
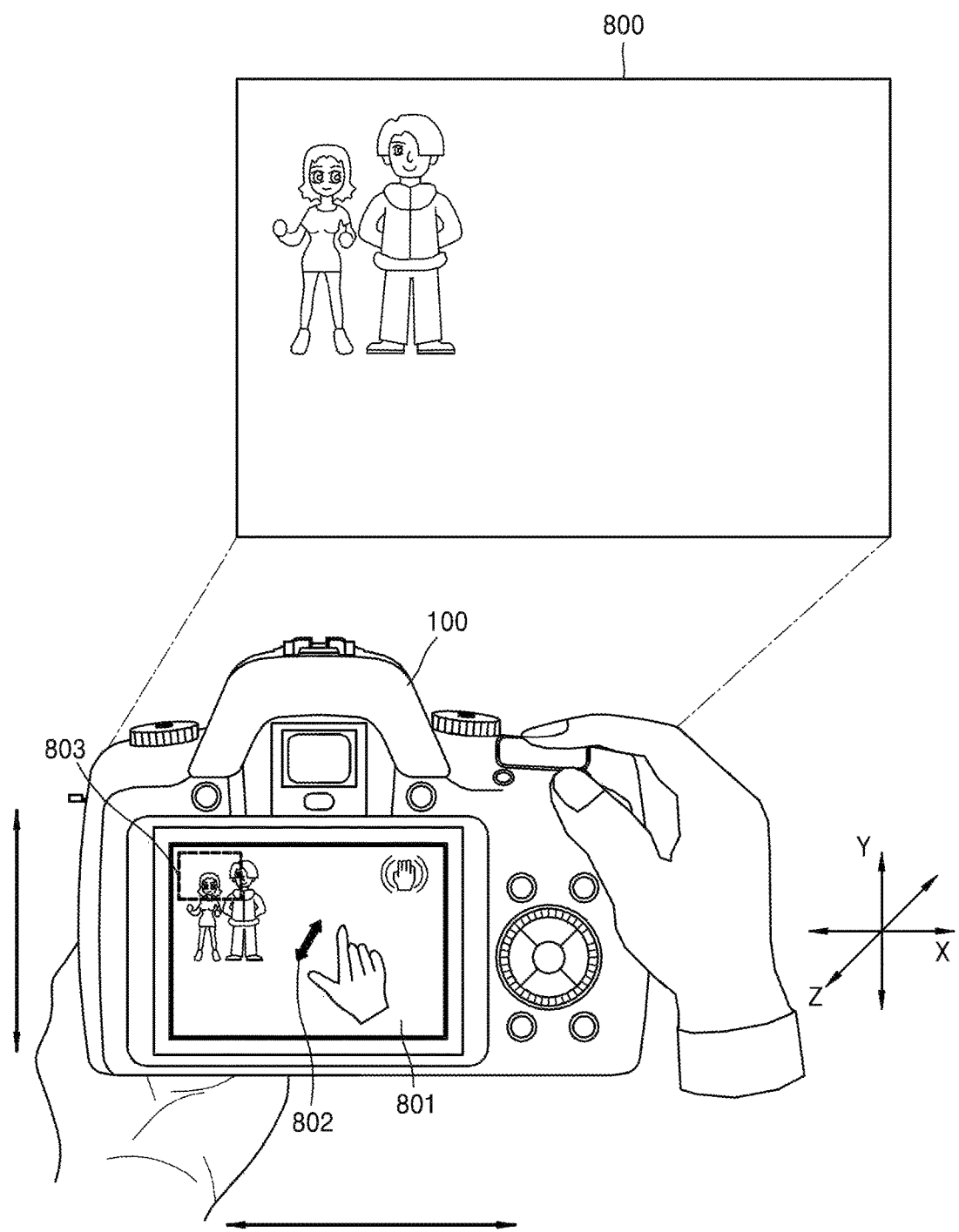

Referring to FIG. 8A, the electronic device 100 may display a preview image 801 of an initial input frame 800 on the touch screen. The electronic device 100 may receive a zoom input 802 for narrowing the angle of view of the initial input frame 800 through the touch screen. For example, the electronic device 100 may receive a pinch input on the preview image 801.

The electronic device 100 may determine a magnifying power (magnification) (e.g., '8×') based on the zoom input 802. The initial zoom area 803 may be an area that the user wants to enlarge (referred to as an ROI below) in the initial input frame 800.

When setting of the initial zoom area 803 and the magnification is finished, capturing a digital zoom video may start. The electronic device 100 may receive a first input frame 810, a second input frame 820, a third input frame 830, and so on. The first input frame 810, the second input frame 820, and the third input frame 830 may have the same angle of view as the initial input frame 800.

Hand tremors may occur during capturing of a digital zoom video. For example, the electronic device 100 may shake in at least one of an x-axis direction, a y-axis direction, and a z-axis direction. Therefore, the position of a subject in each of the first input frame 810, the second input frame 820, and the third input frame 830 may differ from the position of the subject in the initial input frame 800.

Figure 8B:
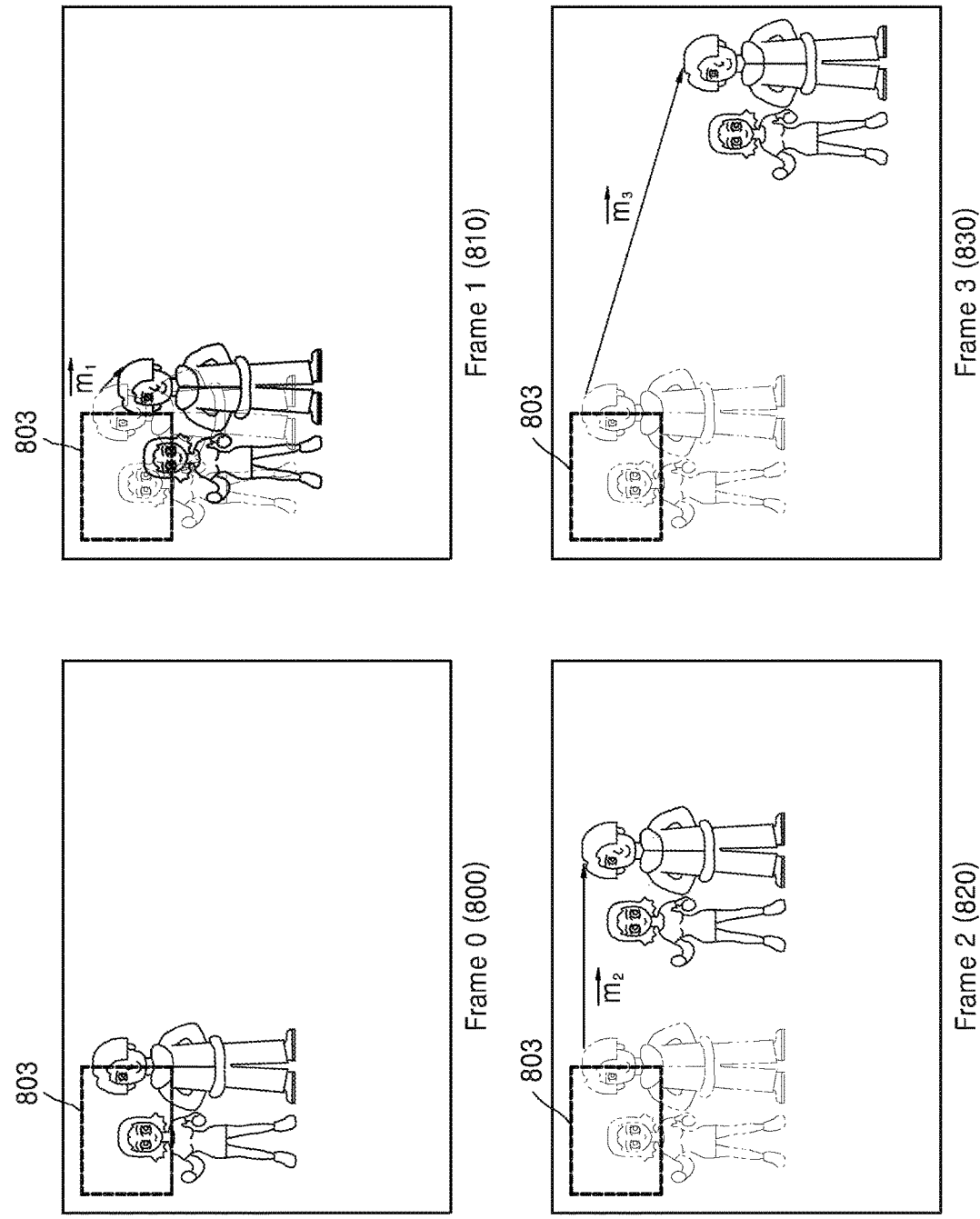

Referring to FIG. 8B, due to hand tremors, the position of the subject in the first input frame 810 may be translated along a vector $m_1$ from the position of the subject in the initial input frame 800, the position of the subject in the second input frame 820 may be translated along a vector $m_2$ from the position of the subject in the initial input frame 800, and the position of the subject in the third input frame 830 may be translated along a vector $m_3$ from the position of the subject in the initial input frame 800.

Figure 8C:
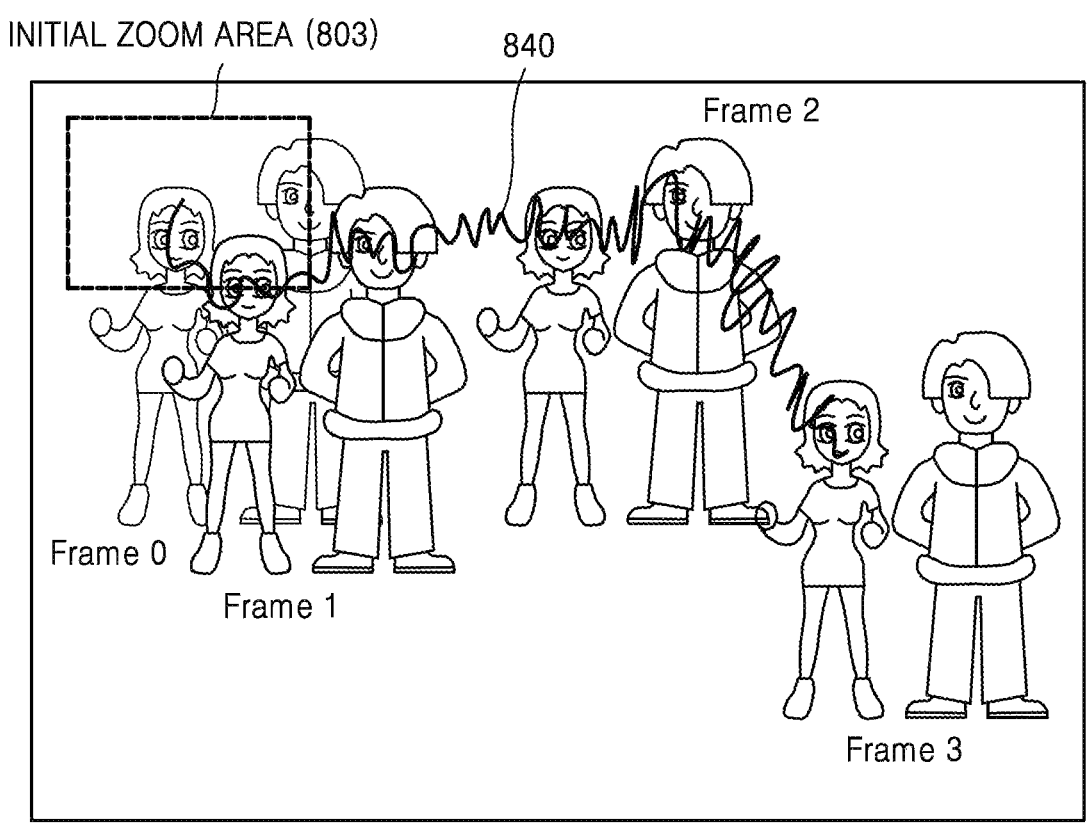

Referring to FIG. 8C, the electronic device 100 may compare the initial input frame 800, the first input frame 810, the second input frame 820, and the third input frame 830 to acquire motion information. Also, the electronic device 100 may acquire motion information using a value measured by the motion sensor.

Using the motion information, the electronic device 100 may generate an image movement path 840 resulting from movement of the electronic device 100 or the subject. According to an example, based on the motion information, the electronic device 100 may generate the image movement path 840 which corresponds to the movement of the subject or is opposed to the movement of the electronic device 100. For example, when the electronic device 100 shakes to the left and the subject is translated to the right in the first input frame 810, the second input frame 820, and the third input frame 830, the image movement path 840 may be generated in a direction in which an x-axis value increases. Also, when the electronic device 100 shakes upward and the subject is translated downward in the first input frame 810, the second input frame 820, and the third input frame 830, the image movement path 840 may be generated in a direction in which a y-axis value decreases.

The electronic device 100 may determine the image movement path 840 taking into account the resolution (size) of the input frames 800, 810, 820, and 830. For example, the electronic device 100 may determine the image movement path 840 so that shaking compensation areas determined based on the image movement path 840 do not deviate from the input frames 800, 810, 820, and 830.

FIG. 8C shows a case in which the image movement path 840 is displayed in a two-dimensional (2D) coordinate system, but the image movement path 840 is not limited to two dimensions. For example, the image movement path 840 may be three-dimensionally generated.

Figure 8D:
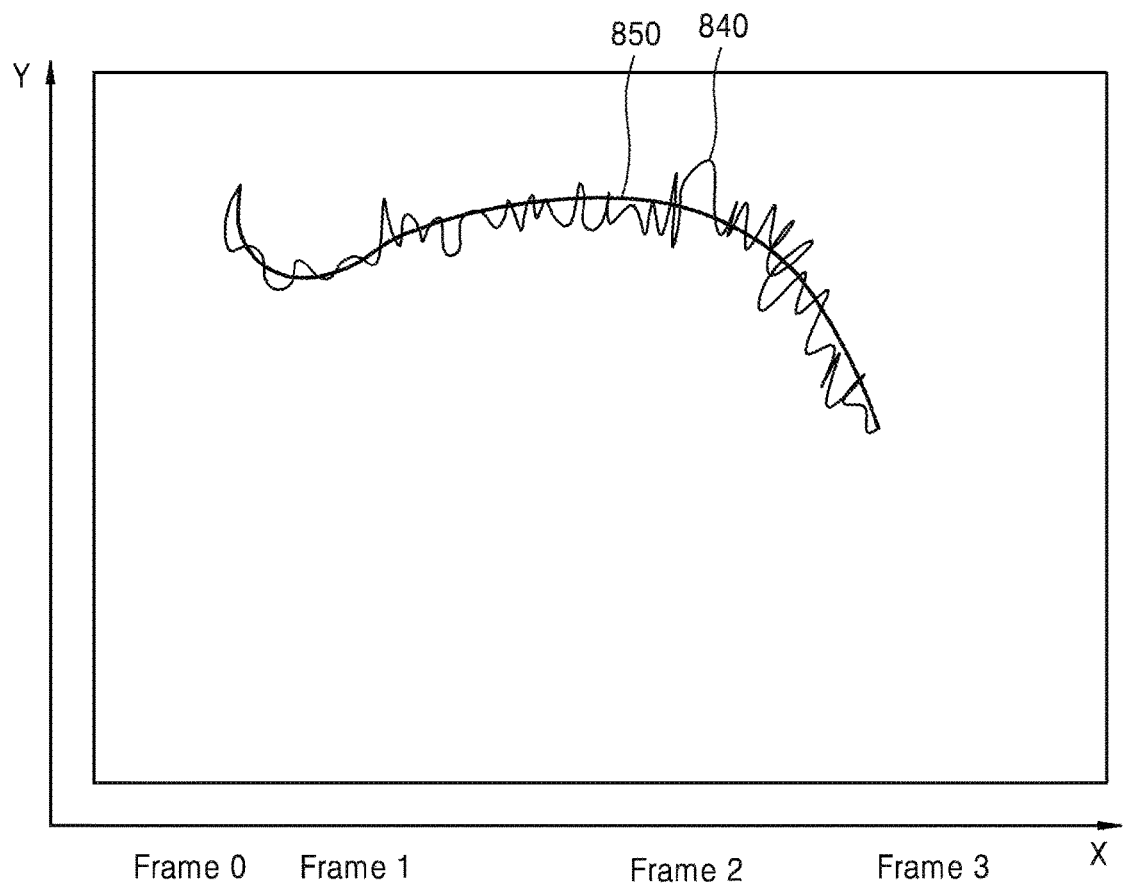

Referring to FIG. 8D, the electronic device 100 may generate a stabilization path 850 using the image movement path 840. For example, the electronic device 100 may generate the stabilization path 850 by processing the image movement path 840 to reduce movement caused by hand tremors.

FIG. 8D illustrates a case in which the stabilization path 850 is displayed in a 2D coordinate system, but the stabilization path 850 is not limited to two dimensions. For example, the stabilization path 850 may be three-dimensionally generated.

Figure 8E:
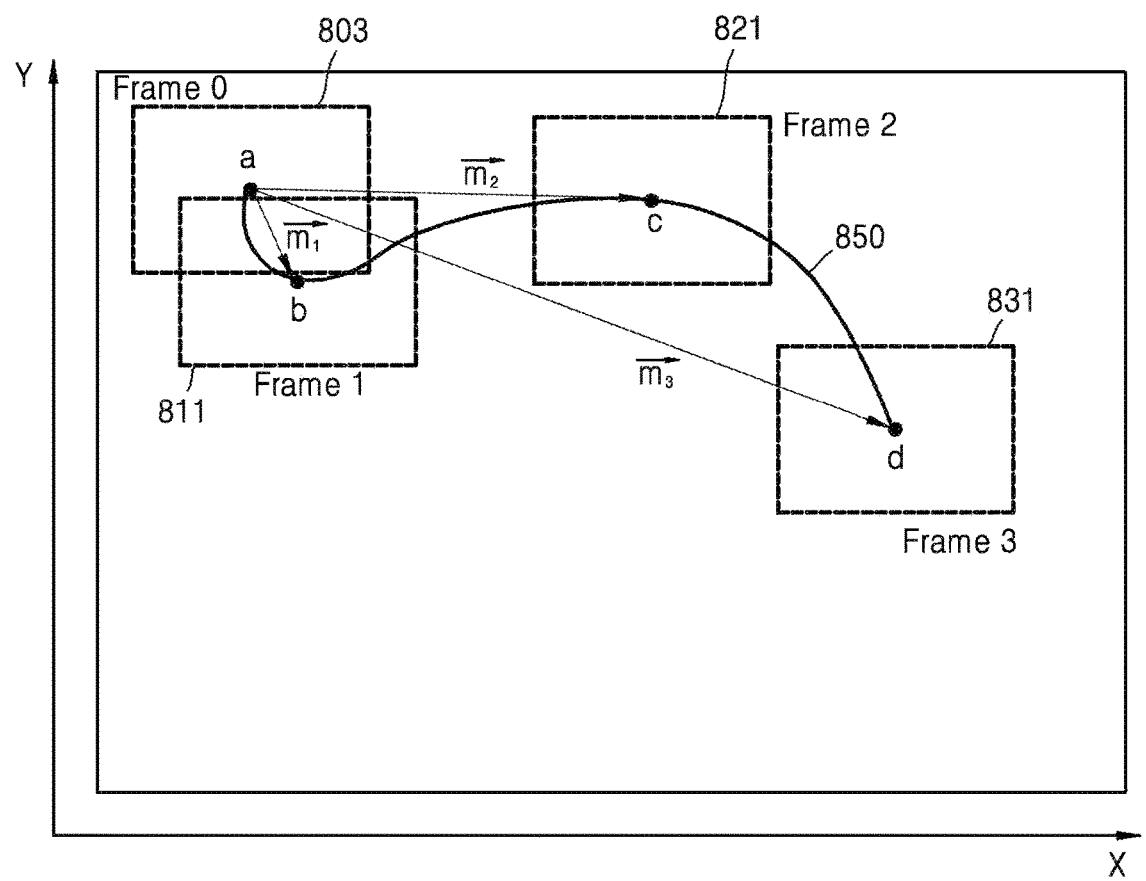

Referring to FIG. 8E, the electronic device 100 may determine the center of a shaking compensation area corresponding to each of the first input frame 810, the second input frame 820, and the third input frame 830 using the stabilization path 850. For example, the electronic device 100 may determine a point b on the stabilization path 850 as the center of a first shaking compensation area 811 of the first input frame 810, determine a point c as the center of a second shaking compensation area 821 of the second input frame 820, and determine a point d as the center of a third shaking compensation area 831 of the third input frame 830.

Referring to FIG. 8F, the electronic device 100 may determine the first shaking compensation area 811 based on the point b in the entire area of the first input frame 810. The first shaking compensation area 811 may be an area which has been translated along the vector $m_1$ from the initial zoom area 803.

The electronic device 100 may determine the second shaking compensation area 821 based on the point c in the entire area of the second input frame 820. The second shaking compensation area 821 may be an area which has been translated along the vector $m_2$ from the initial zoom area 803.

The electronic device 100 may determine the third shaking compensation area 831 based on the point d in the entire area of the third input frame 830. The third shaking compensation area 831 may be an area which has been translated along the vector $m_3$ from the initial zoom area 803.

Figure 8G:
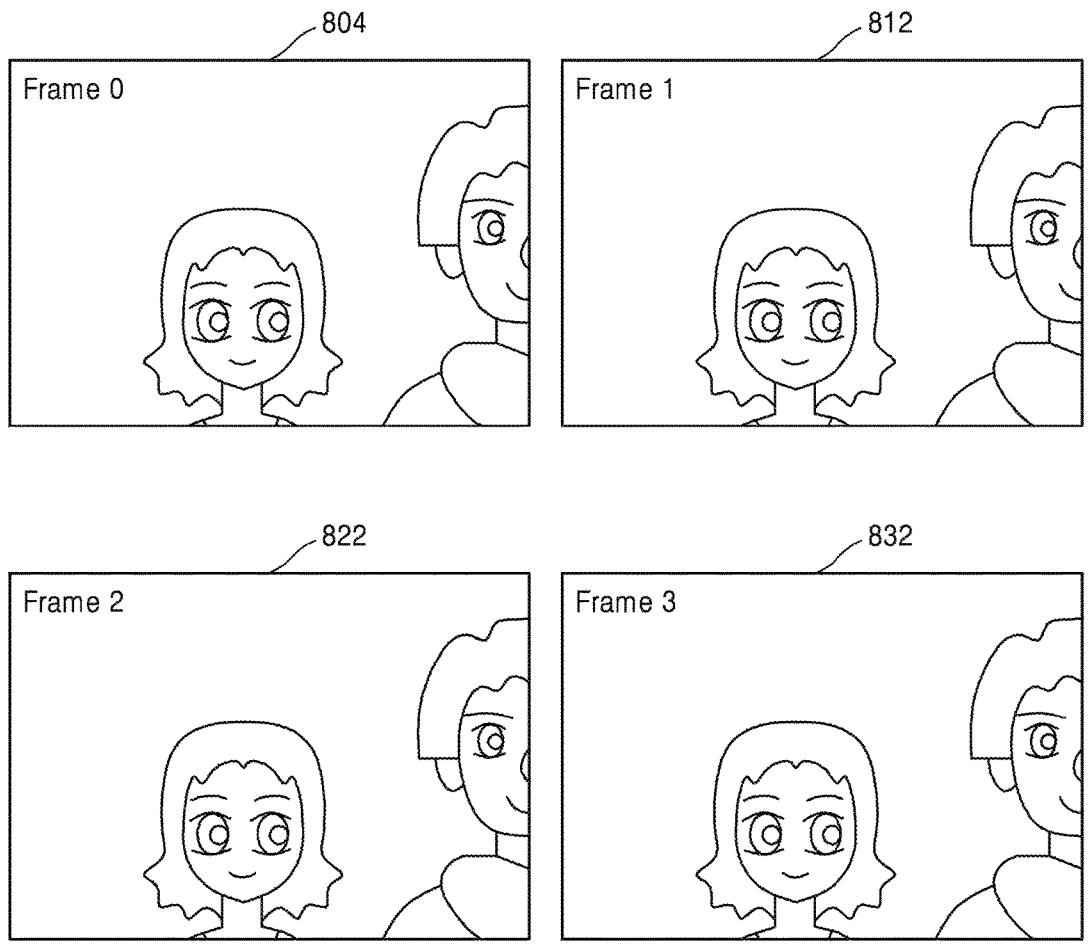

Referring to FIG. 8G, the electronic device 100 may generate an initial output frame 804 corresponding to the initial input frame 800 by enlarging the initial zoom area 803 based on an output size. The electronic device 100 may generate a first output frame 812 corresponding to the first input frame 810 by enlarging the first shaking compensation area 811 based on the output size. The electronic device 100 may generate a second output frame 822 corresponding to the second input frame 820 by enlarging the second shaking compensation area 821 based on the output size. The electronic device 100 may generate a third output frame 832 corresponding to the third input frame 830 by enlarging the third shaking compensation area 831 based on the output size.

The electronic device 100 may generate a digital zoom video by combining the initial output frame 804, the first output frame 812, the second output frame 822, and the third output frame 832. Since there is almost no motion difference between the output frames 804, 812, 822, and 832, the user may not perceive shaking when the digital zoom video is played.

Figure 9:
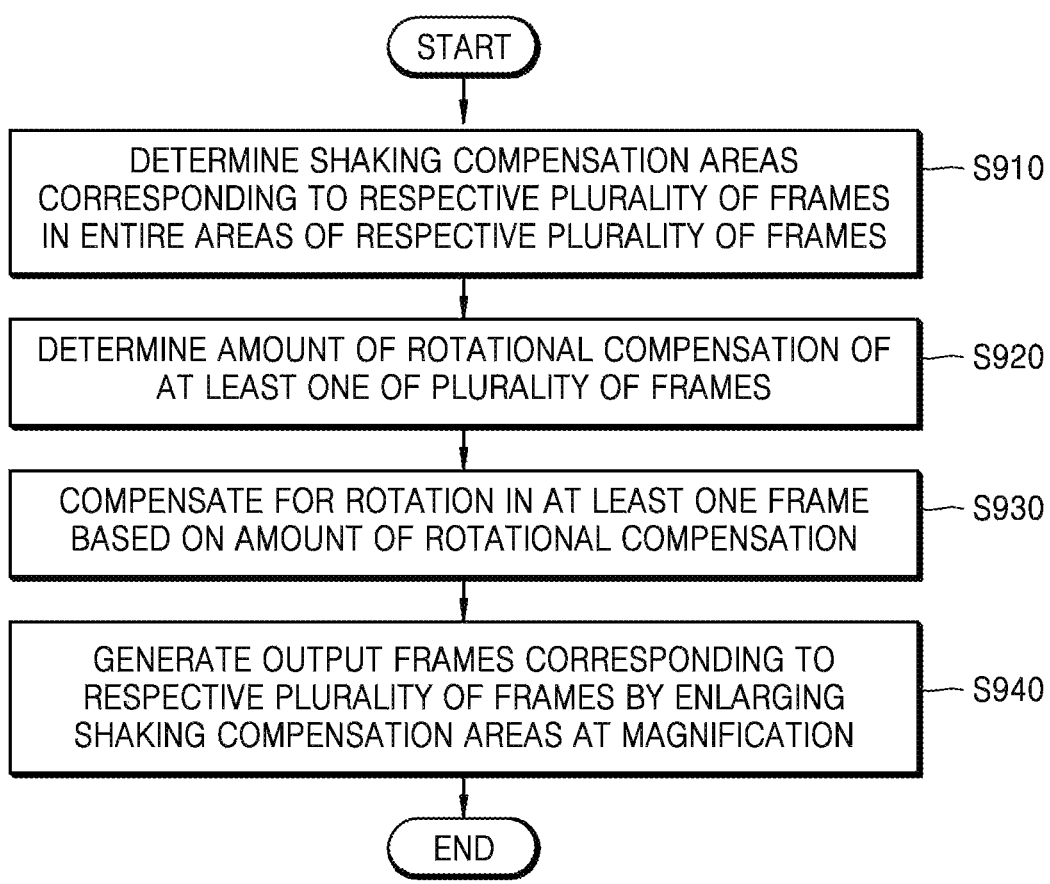
FIG. 9 is a flowchart illustrating an example method in which an electronic device compensates for rotation in at least one frame.

FIG. 9 is a flowchart illustrating an example method in which an electronic device compensates for rotation in at least one frame.

In operation S910, the electronic device 100 may determine shaking compensation areas corresponding to a respective plurality of frames in the entire areas of the respective plurality of frames. According to an example, a shaking compensation area may be determined in a variety of forms for translation, rotation, or rolling shutter compensation without having a particular size or shape.

In operation S920, the electronic device 100 may determine the amount of rotational compensation of at least one of the plurality of frames. For example, when the rotation angle of a first input frame is changed due to hand tremors with respect to that of an initial input frame, the electronic device 100 may determine the amount of rotational compensation of the first input frame based on rotational component information included in shaking information. For example, when the rotation angle of the initial input frame is 0 degrees in the z-axis direction based on the x-y plane and the rotation angle of the first input frame is +10 degrees in the z-axis direction based on the x-y plane, the amount of rotational compensation may be −10 degrees.

In operation S930, the electronic device 100 may compensate for rotation in the at least one frame based on the amount of rotational compensation. For example, the electronic device 100 may translate a shaking compensation area to the central area of the frame, and rotate the frame by the amount of rotational compensation. The electronic device 100 may adjust the position of the shaking compensation area so that the shaking compensation area comes to the center of the rotated frame. The electronic device 100 may compensate for rotational components of the frame which has been rotated by hand tremors irrespective of the user's intention.

In operation S940, the electronic device 100 may generate output frames corresponding to the respective plurality of frames by enlarging the shaking compensation areas at a magnification. Since operation S940 corresponds to operation S450 of FIG. 4, the detailed description will be omitted.

An operation of the electronic device 100 compensating for rotation in at least one frame will be further described below with reference to FIGS. 10 and 11.

Figure 10:
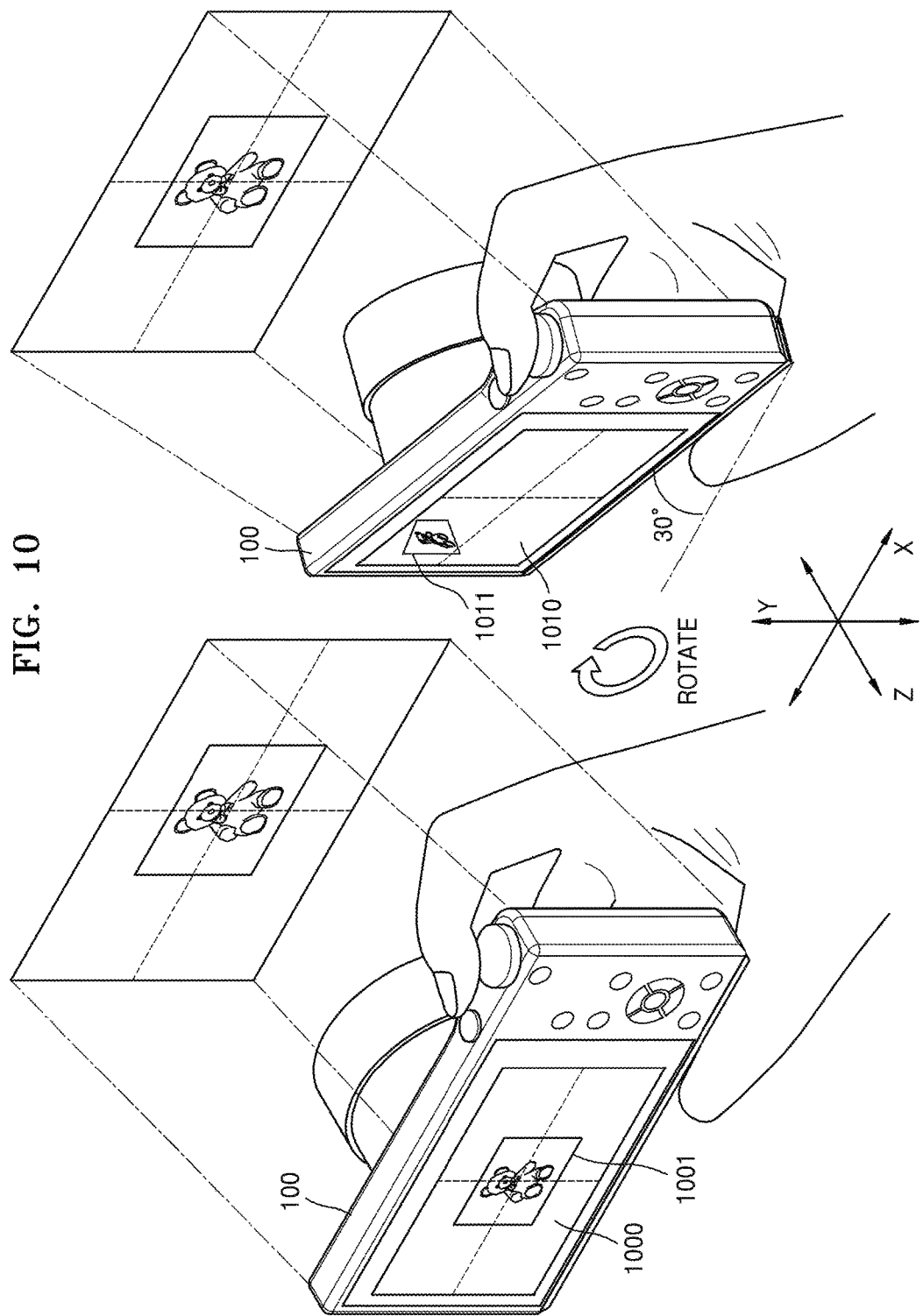
FIG. 10 includes diagrams illustrating an example frame in which a subject has been rotated.

FIG. 10 includes diagrams illustrating an example frame in which a subject has been rotated.

Referring to FIG. 10, the electronic device 100 may be rotated by hand tremors during capturing of a digital zoom video. For example, the electronic device 100 may be rotated 30 degrees in the z-axis direction based on the x-y plane. Compared to a subject of an initial input frame 1000, the subject of a first input frame 1010 may be rotated 30 degrees in the negative z-axis direction based on the x-y plane.

To compensate for the rotation in the first input frame 1010, the electronic device 100 may determine a trapezoidal shaking compensation area 1011 in the entire area of the first input frame 1010. For example, while the shaking compensation area 1001 in the initial input frame 1000 is a square shape, the shaking compensation area 1011 in the first input frame 1010 may be a trapezoid.

A process in which the electronic device 100 compensates for rotation in the first input frame 1010 will be described in greater detail with reference to FIG. 11.

The case in which the electronic device 100 is rotated in the z-axis direction based on the x-y plane has been described as an example with reference to FIG. 10, but rotation of the electronic device 100 is not limited to this case. For example, the electronic device 100 may be rotated in the y-axis direction based on the x-z plane, or rotated in the x-axis direction based on the y-z plane, etc.

Figure 11:
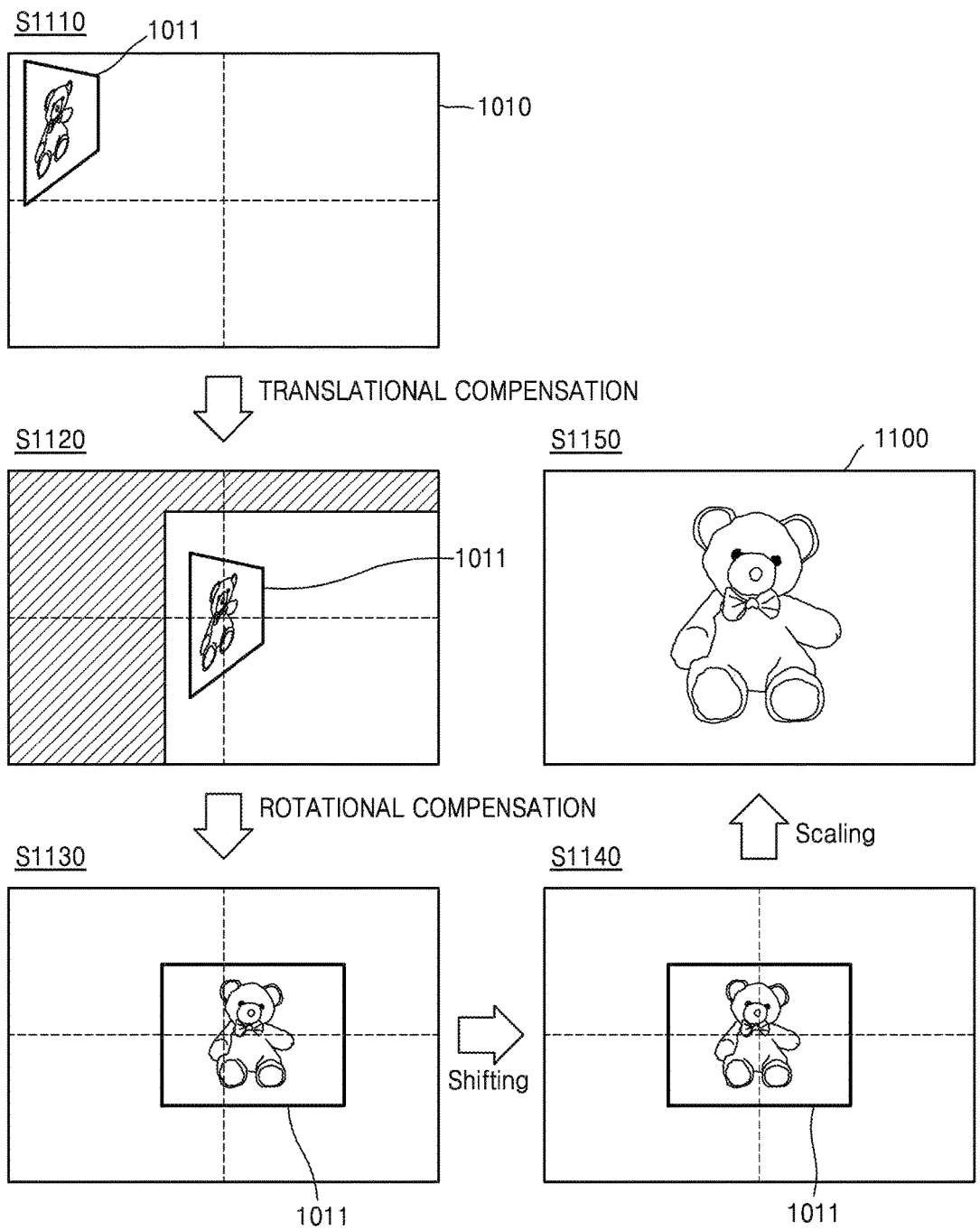
FIG. 11 includes diagrams illustrating an example in which an electronic device corrects a frame having a rotated subject therein.

FIG. 11 includes diagrams illustrating an example in which an electronic device corrects a frame having a rotated subject therein.

In operation S1110, the electronic device 100 may determine the trapezoidal shaking compensation area 1011 in the entire area of the first input frame 1010 using shaking information.

In operation S1120, the electronic device 100 may perform translational compensation so that the shaking compensation area 1011 is positioned at the central area of the first input frame 1010. For example, the electronic device 100 may translate a whole image in the first input frame 1010 to the right.

In operation S1130, the electronic device 100 may perform rotational compensation of the first input frame 1010. For example, since the subject in the first input frame 1010 has been rotated 30 degrees in the negative z-axis direction based on the x-y plane compared to the subject in the initial input frame 1000, the electronic device 100 may rotate the first input frame 1010 30 degrees in the positive z-axis direction based on the x-y plane based, for example, on an image warping method.

In operation S1140, the electronic device 100 may perform a shifting procedure so that the first shaking compensation area 1011 subjected to rotational compensation is positioned at the central area of the first input frame 1010.

In operation S1150, the electronic device 100 may generate an output frame 1100 corresponding to the first input frame 1010 by enlarging the first shaking compensation area 1011 positioned at the central area at a magnification based on an output size.

The electronic device 100 may correct rolling shutter distortion of the original frame while performing rotational compensation of the original frame. Rolling shutter distortion will be described below with reference to FIG. 12.

Figure 12:
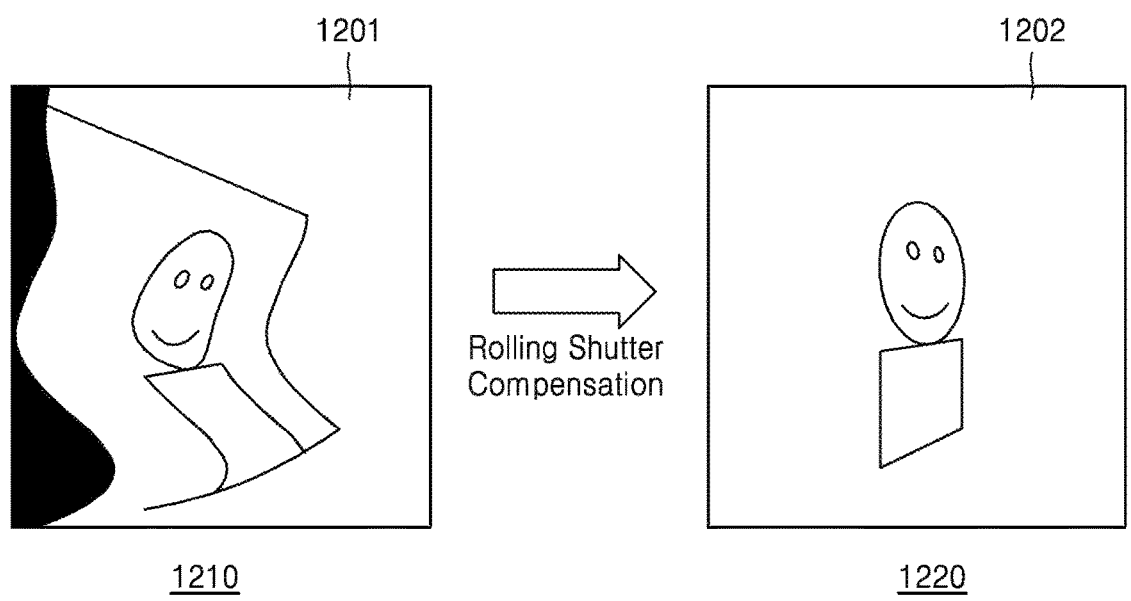
FIG. 12 includes diagrams illustrating an example operation of an electronic device correcting rolling shutter distortion.

FIG. 12 includes diagrams illustrating an example operation of an electronic device correcting rolling shutter distortion.

When the image sensor used in the electronic device 100 is a complementary metal-oxide semiconductor (CMOS) image sensor (CIS), rolling shutter distortion may occur. The CIS may output image data in units of horizontal lines. For example, data of a second line may be output after data of a first line is output, and data of a third line may be output after the data of the second line is output. The way in which image data is output in units of horizontal lines is referred to as a rolling shutter method. The CIS does not cause a serious problem in general situations, but may result in rolling shutter distortion in output results when shaking occurs. For example, when a rapidly moving object is captured or hand tremors occur during capturing, rolling shutter distortion may be found in captured results.

Referring to 1210 of FIG. 12, hand tremors result in a change in the value of a t-th line while a (t−1)th line is output, and result in a change in the value of a (t+1)th line while the t-th line is output). Therefore, the electronic device 100 obtains a first image 1201 having rolling shutter distortion rather than a second image 1202 to be output normally.

Referring to 1220 of FIG. 12, the electronic device 100 may obtain the second image 1202 by correcting the first image 1201 having rolling shutter distortion. For example, the electronic device 100 may inversely compensate for distortion caused by time difference between sensor lines using line-specific motion vectors of the first image 1201, thereby obtaining the second image 1202.

Figure 13:
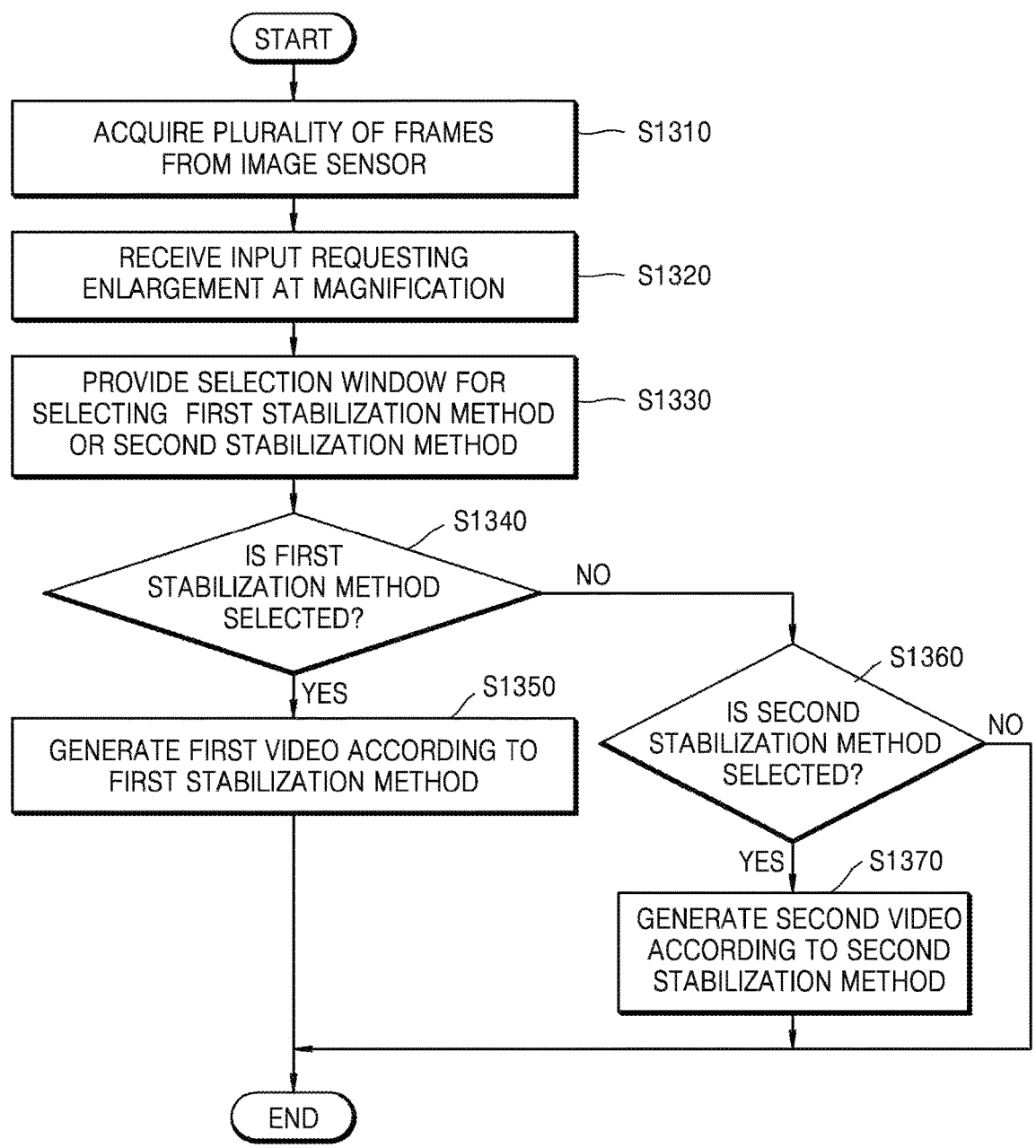
FIG. 13 is a flowchart illustrating an example method in which an electronic device provides a selection window for selecting a stabilization method.

FIG. 13 is a flowchart illustrating an example method in which an electronic device provides a selection window for selecting a stabilization method.

In operation S1310, the electronic device 100 may acquire a plurality of frames from the image sensor. For example, the electronic device 100 may acquire the plurality of original frames using an image signal input by the image sensor. At this time, the electronic device 100 may acquire original frames having a previously set angle of view or the maximum angle of view.

In operation S1320, the electronic device 100 may receive an input requesting enlargement at a magnification. According to an example, the electronic device 100 may receive a zoom input for narrowing the angle of view of the original frames through the touch screen, but a zoom input is not limited thereto.

In operation S1330, the electronic device 100 may provide a selection window for selecting the first stabilization method or the second stabilization method. For example, when a zoom input is received, the electronic device 100 may provide a selection window for selecting a method of stabilizing a digital zoom video. The first stabilization method may be crop zoom DIS compensating for shaking in a cropping area of an original frame, and the second stabilization method may be full zoom DIS of compensating for shaking in the entire area of an original frame.

In operation S1340 and operation S1350, when the first stabilization method is selected, the electronic device 100 may, for example, generate a first video based on the first stabilization method. For example, the electronic device 100 may generate a digital zoom video stabilized based on crop zoom DIS disclosed in FIG. 2.

In operation S1360 and operation S1370, when the second stabilization method is selected, the electronic device 100 may generate a second video based on the second stabilization method. For example, the electronic device 100 may generate a digital zoom video stabilized based on full zoom DIS disclosed in FIG. 5.

FIGS. 14 and 15 are diagrams illustrating an example operation of an electronic device providing a selection window for selecting a stabilization method.

Referring to 1400-1 of FIG. 14, the electronic device 100 may receive a zoom input 1410 for narrowing the angle of view. For example, the electronic device 100 may receive a pinch input of spreading two fingers in different directions while keeping the two fingers in contact with a preview image.

Referring to 1400-2 of FIG. 14, when the zoom input 1410 is received, the electronic device 100 may display a selection window 1420 for selecting a stabilization method on the screen before generating a digital zoom video. The selection window 1420 may include a first button for selecting the first stabilization method (crop zoom DIS) and a second button for selecting the second stabilization method (full zoom DIS).

When the second button is selected, the electronic device 100 may generate a digital zoom video stabilized based on the second stabilization method (full zoom DIS).

Referring to 1500-1 of FIG. 15, the electronic device 100 may receive an input 1510 for switching from a still image capturing mode to a video capturing mode. For example, the electronic device 100 may sense an input of dragging a capturing mode switch button in the execution window of a camera application.

Referring to 1500-2 of FIG. 15, when the input 1510 for switching from the still image capturing mode to the video capturing mode is received, the electronic device 100 may display a selection window 1520 for selecting a stabilization method on the screen before generating a digital zoom video. The selection window 1520 may include a first button for selecting the first stabilization method (crop zoom DIS) and a second button for selecting the second stabilization method (full zoom DIS). When the second button is selected, the electronic device 100 may generate a digital zoom video stabilized according to the second stabilization method (full zoom DIS).

Examples in which the electronic device 100 provides a selection window for selecting a stabilization method may be diverse. For example, a stabilization method to full zoom DIS may be set in a configuration menu before executing a camera application.

Figure 16:
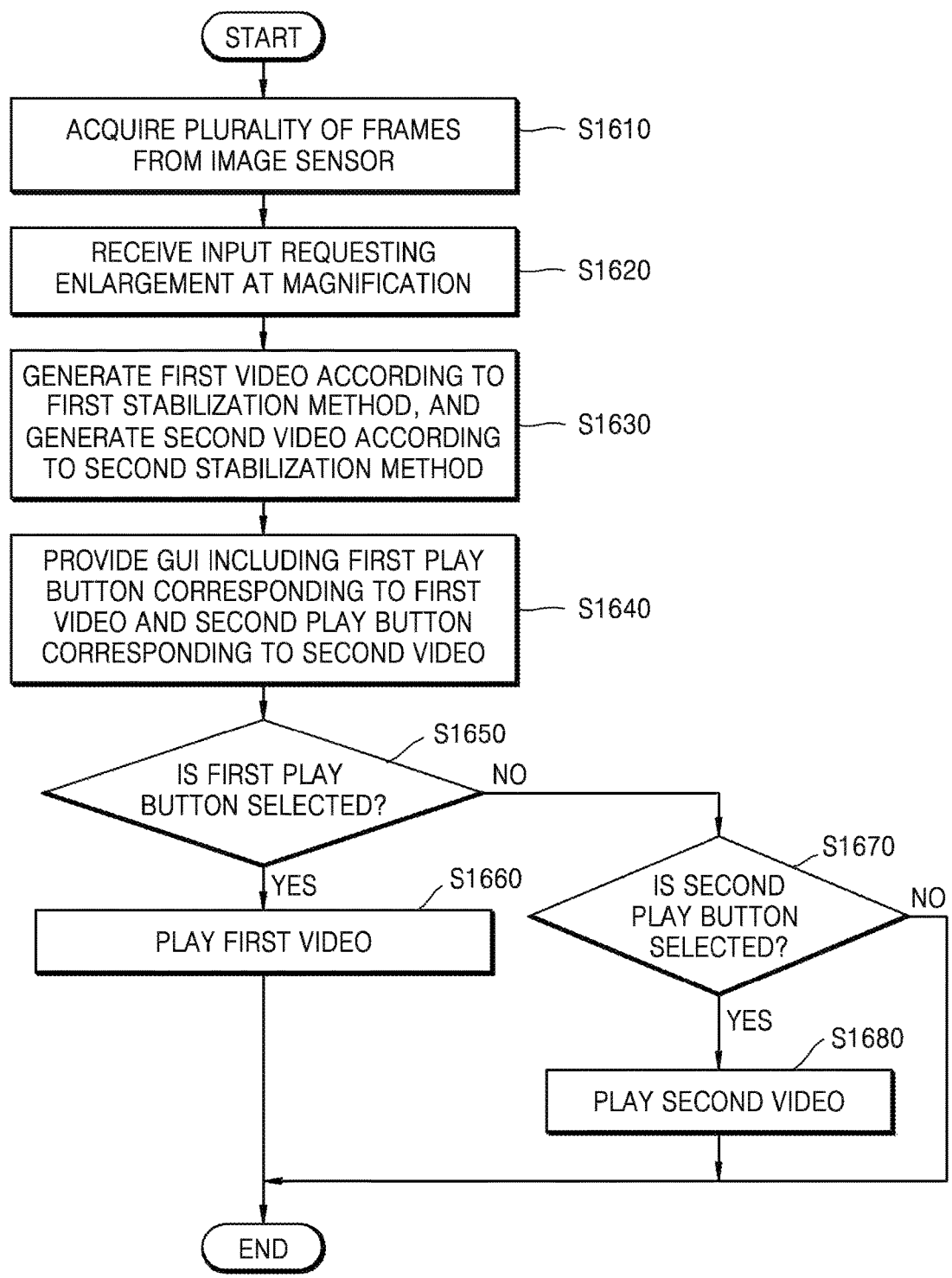
FIG. 16 is a flowchart illustrating an example method in which an electronic device provides a plurality of videos generated using a plurality of stabilization methods.

FIG. 16 is a flowchart illustrating an example method in which an electronic device provides a plurality of videos generated using a plurality of stabilization methods.

In operation S1610, the electronic device 100 may acquire a plurality of frames from the image sensor. For example, the electronic device 100 may acquire the plurality of original frames using an image signal input by the image sensor.

In operation S1620, the electronic device 100 may receive an input requesting enlargement at a magnification. According to an example, the electronic device 100 may receive a zoom input for narrowing the angle of view of the original frames through the touch screen, but a zoom input is not limited thereto.

In operation S1630, the electronic device 100 may generate a first video based on the first stabilization method and generate a second video based on the second stabilization method. The first stabilization method may, for example, be crop zoom DIS of compensating for shaking in a cropping area of an original frame, and the second stabilization method may, for example, be full zoom DIS of compensating for shaking in the entire area of an original frame.

For example, the electronic device 100 may generate a first digital zoom video stabilized based on a first method (crop zoom DIS) disclosed in FIG. 2. Also, the electronic device 100 may generate a second digital zoom video stabilized based on a second method (full zoom DIS) disclosed in FIG. 5.

In operation S1640, the electronic device 100 may provide a GUI which includes a first play button corresponding to the first video and a second play button corresponding to the second video. For example, the electronic device 100 may display the first play button for playing the first video stabilized by crop zoom DIS and a second play button for playing the second video stabilized by full zoom DIS on the screen.

In operation S1650 and operation S1660, when the first play button is selected, the electronic device 100 may play the first video. For example, the electronic device 100 may play the first digital zoom video stabilized using crop zoom DIS.

In operation S1670 and operation S1680, when the second play button is selected, the electronic device 100 may play the second video. For example, the electronic device 100 may play the second digital zoom video stabilized using full zoom DIS.

FIGS. 17 and 18 illustrate example GUIs for providing a plurality of videos generated by an electronic device using a plurality of stabilization methods.

Referring to 1710 of FIG. 17, the electronic device 100 may receive an input for activating a video management application 1700. For example, the electronic device 100 may receive an input of touching the icon of the video management application 1700 among a plurality of icons. The electronic device 100 may execute the video management application 1700 and display the execution window of the video management application 1700.

Referring to 1720 of FIG. 17, the electronic device 100 may display a first video 1701 and a second video 1702 which are respectively obtained by stabilizing N original frames using the first stabilization method (crop zoom DIS) and the second stabilization method (full zoom DIS) on the execution window of the video management application 1700.

When the play button of the second video 1702 is selected, the electronic device 100 may play the second video 1702 stabilized using the second stabilization method (full zoom DIS).

Referring to 1810 of FIG. 18, the electronic device 100 may display a play icon 1800 of a video captured during travel. At this time, the electronic device 100 may receive an input of, for example, touching the play icon 1800 of the video.

Referring to 1820 of FIG. 18, the electronic device 100 may provide a selection window 1801 for selecting a stabilization method in response to the input of touching the play icon 1800. For example, the selection window 1801 may include a first button for selecting the first stabilization method (e.g., crop zoom DIS) and a second button for selecting the second stabilization method (e.g., full zoom DIS).

When the first button is selected, the electronic device 100 may play a first digital zoom video stabilized using the first stabilization method (crop zoom DIS). When the second button is selected, the electronic device 100 may play a second digital zoom video stabilized using the second stabilization method (full zoom DIS).

According to an example, although not shown in FIG. 18, the electronic device 100 may automatically select and play one of the first digital zoom video and the second digital zoom video in response to the input of touching the play icon 1800. For example, the electronic device 100 may compare the degrees of shaking of the first digital zoom video and the second digital zoom video, and provide only one of the first digital zoom video and the second digital zoom video to the user based on the comparison result.

Figure 19:
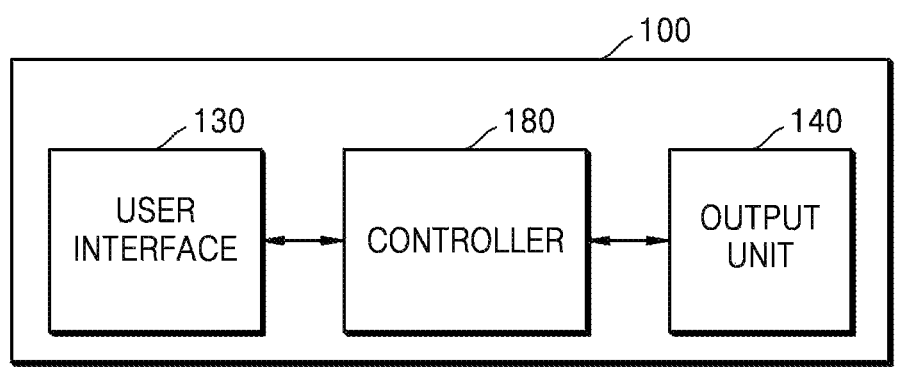
FIGS. 19 and 20 are block diagrams illustrating an example constitution of an electronic device.
Figure 20:
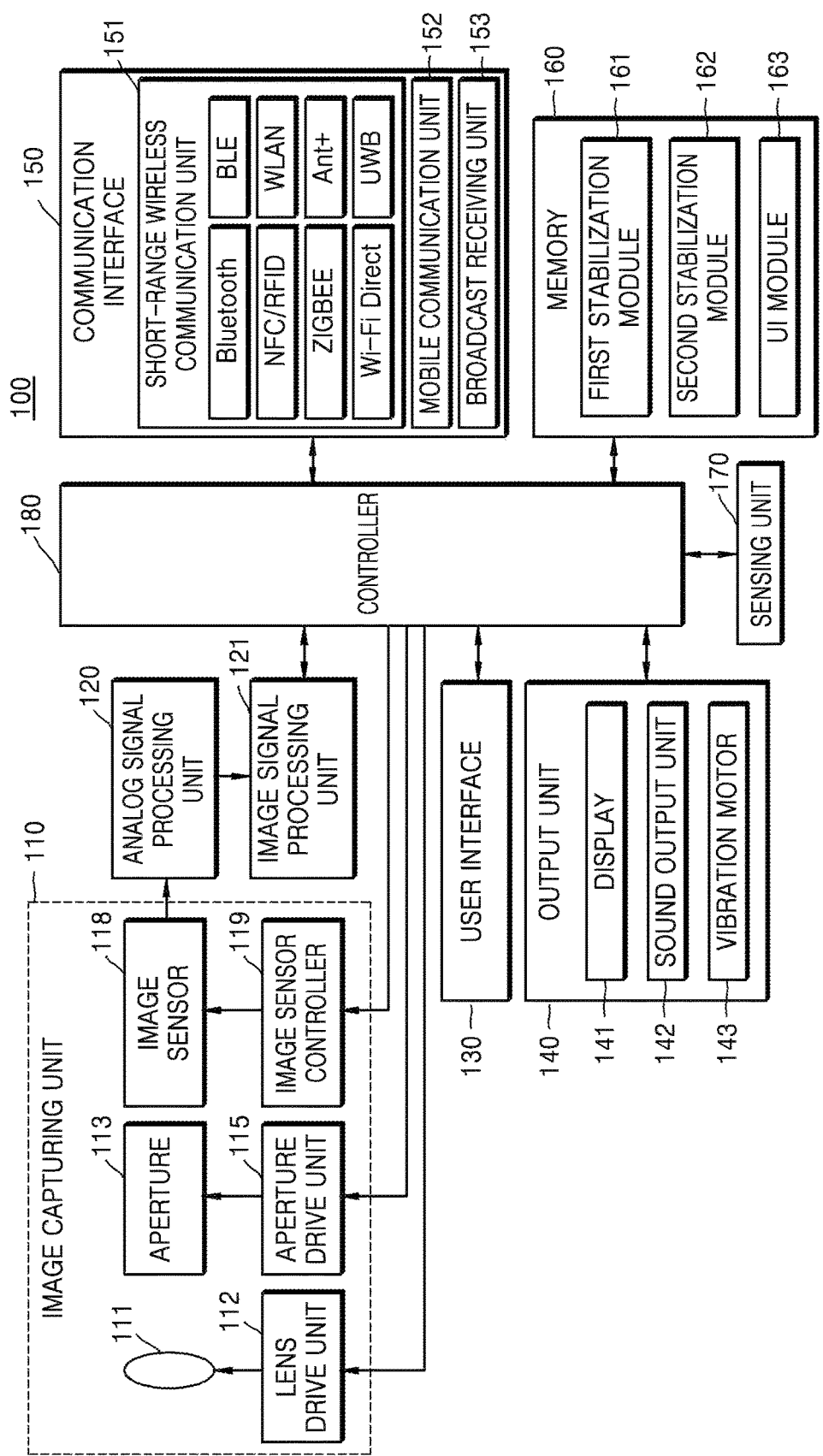

FIGS. 19 and 20 are block diagrams illustrating an example electronic device.

As illustrated in FIG. 19, the electronic device 100 according to an example may include a user interface (UI) 130, an output unit 140, and a controller 180. However, not all components shown in the drawing are essential components. The electronic device 100 may be implemented by more or less components than shown in the drawing.

For example, as illustrated in FIG. 20, the electronic device 100 according to an example may further include an image capturing unit 110, an analog signal processing unit 120, an image signal processing unit 121, a communication interface 150, a memory 160, and a sensing unit 170 in addition to the UI 130, the output unit 140, and the controller 180.

The components will be described in greater detail below.

The image capturing unit 110 may, for example, refer to a component which generates images of an electrical signal from incident light, and includes a lens 111, a lens drive unit 112, an aperture 113, an aperture drive unit 115, an image sensor 118, and an image sensor controller 119.

The lens 111 may have a plurality of lenses in a plurality of groups. The position of the lens 111 may be adjusted by the lens drive unit 112. The lens drive unit 112 adjusts the position of the lens 111 based on a control signal provided, for example, by the controller 180.

Also, the lens drive unit 112 may adjust a focal length and perform operations, such as autofocusing, zoom change, and focus change, by adjusting the position of the lens 111.

The degree of opening or closure of the aperture 113 may be adjusted by the aperture drive unit 115, and the aperture 113 adjusts the amount of light which is incident on the image sensor 118.

An optical signal transmitted through the lens 111 and the aperture 113 forms an image of a subject on a light-receiving surface of the image sensor 118. The image sensor 118 may, for example, be a charge coupled device (CCD) or a CIS which converts the optical signal into an electrical signal. The sensitivity, etc. of the image sensor 118 may be adjusted by the image sensor controller 119. The image sensor controller 119 may be configured to control the image sensor 118 based on a control signal automatically generated by an image signal which is input in real time or a control signal manually input, for example, by the user's manipulation.

The analog signal processing unit 120 may include a processor, and may be configured to perform noise reduction, gain adjustment, waveform standardization, analog-to-digital conversion, etc. on an analog signal supplied from the image sensor 118.

The image signal processing unit 121 may include a signal processing unit for processing a special function for an image data signal processed by the analog signal processing unit 120. For example, the image signal processing unit 121 may be configured to reduce noise in input image data, and to perform image signal processing, such as gamma correction, color filter array interpolation, color matrix, color correction, color enhancement, white balance adjustment, luminance smoothing, and color shading, for improving image quality and providing special effects. The image signal processing unit 121 may be configured to generate an image file by compressing the input image data, or to restore the image data from the image file. A compression format of an image may be reversible or irreversible. For example, a still image may be converted into a Joint Photographic Experts Group (JPEG) format, a JPEG 2000 format, or so on. Also, when recording a video, the image signal processing unit 121 may be configured to generate a video file by compressing a plurality of frames according to a Moving Picture Experts Group (MPEG) standard. The image file may be generated, for example, according to an exchangeable image file format (Exif) standard.

The image signal processing unit 121 may be configured to generate a video file from an image signal generated by the image sensor 118. The image signal processing unit 121 may be configured to generate frames to be included in a video file from the image signal. For example, the image signal processing unit 121 may compress the frames according to a standard, such as MPEG4, H.264/Advanced Video Coding (AVC), Windows Media Video (WMV), etc., and then generate a video file using the compressed frames. The video file may be generated in a variety of formats such as mpg, mp4, 3gpp, avi, asf, and mov.

Image data output from the image signal processing unit 121 may be stored in the memory 160. Also, the image data output from the image signal processing unit 121 may be stored in a memory card automatically or based on a signal from the user. The memory card may be attachable/detachable, or permanently installed in the electronic device 100. For example, the memory card may be a flash memory card such as an SD card.

In addition, the image signal processing unit 121 may be configured to perform obscuring, chromatic processing, blurring, edge emphasis, image interpretation, image recognition, image effect processing, etc. on the input image data. Through image recognition, face recognition, scene recognition, etc. may be performed. According to an example, the image signal processing unit 121 may be configured to perform compensation for hand tremors, correction of rolling shutter distortion, and so on.

According to an example, the image signal processing unit 121 may be configured to process a display image signal to be displayed through a display 141. For example, the image signal processing unit 121 may be configured to perform luminance level adjustment, color correction, contrast adjustment, contour emphasis adjustment, screen segmentation, generation of a character image, etc., image composition, and so on.

A signal processed by the image signal processing unit 121 may be input to the controller 180 either through or not through the memory 160.

The image signal processing unit 121 denotes or refers to a unit to which the user inputs data for controlling the electronic device 100. For example, the UI 130 may be a key pad, a dome switch, a touchpad (a capacitive overlay touchpad, a resistive overlay touchpad, an infrared beam touchpad, a surface acoustic wave touchpad, an integral strain gauge touchpad, a piezoelectric effect touchpad, etc.), a jog wheel, a jog switch, etc., but is not limited thereto.

The UI 130 may receive an input requesting enlargement at a magnification in relation to a plurality of frames acquired from the image sensor 118. For example, the UI 130 may receive a pinch input through a touch screen on which a preview image is displayed, but the user input is not limited thereto.

The output unit 140 may output an audio signal, a video signal, or a vibration signal, and may include the display 141, a sound output unit 142, a vibration motor 143, and so on.

The display 141 may output information processed in the electronic device 100. For example, the display 141 may display a preview image, a video file list, a digital zoom video, and so on.

According to an example, the display 141 may display a selection window for selecting the first stabilization method of determining a shaking compensation area in a cropping area of an input frame or the second stabilization method of determining a shaking compensation area in the entire area of an input frame.

Also, the display 141 may display a GUI including a first play button corresponding to a first video generated by the first stabilization method and a second play button corresponding to a second video generated by the second stabilization method.

Meanwhile, when the display 141 and a touchpad may be layered to form a touch screen, the display 141 may be used as an input device as well as an output device. The display 141 may, for example, include at least one of a liquid crystal display (LCD), a thin film transistor (TFT)-LCD, an organic light-emitting diode (OLED) display, a flexible display, a three-dimensional (3D) display, and an electrophoretic display. Based on a form of the electronic device 100, the electronic device 100 may include two or more displays 141.

The sound output unit 142 outputs audio data received from the communication interface 150 or stored in the memory 160. Also, the sound output unit 142 outputs a sound signal (e.g., a call signal reception sound, a message reception sound, or a notification sound) related to functions performed by the electronic device 100. The sound output unit 142 may include a speaker, a buzzer, and so on.

The vibration motor 143 may output a vibration signal. For example, the vibration motor 143 may output a vibration signal corresponding to an output of audio data (e.g., a call signal reception sound and a message reception sound) or video data. Also, the vibration motor 143 may output a vibration signal when a touch is input to the touch screen.

The communication interface 150 may include one or more components, including communication circuitry for enabling communication between the electronic device 100 and, for example, a cloud server, an external device, an SNS server, or an external wearable device. For example, the communication interface 150 may include a short-range wireless communication unit 151, a mobile communication unit 152, and a broadcast receiving unit 153.

The short-range wireless communication unit 151 may include a Bluetooth communication unit, a Bluetooth low energy (BLE) communication unit, a near field communication unit, a wireless local area network (WLAN; wireless fidelity (Wi-Fi)) communication unit, a ZigBee communication unit, an Infrared Data Association (IrDA) communication unit, a Wi-Fi direct (WFD) communication unit, an ultra wideband (UWB) communication unit, an Ant+ communication unit, etc., but is not limited thereto.

The mobile communication unit 152 exchanges wireless signals with at least one of a base station, an external terminal, and a server in a mobile communication network. The wireless signals may include voice call signals, video call signals, or various types of data according to transmission and reception of text/multimedia messages. The mobile communication unit 152 may use at least one of Long-Term Evolution (LTE), LTE Advanced (LTE-A), code division multiple access (CDMA), wideband CDMA (WCDMA), Universal Mobile Telecommunications System (UMTS), Wireless Broadband (WiBro), Global System for Mobile Communications (GSM), and so on.

The broadcast receiving unit 153 receives a broadcasting signal and/or broadcast-related information from the outside of the electronic device 100 through a broadcasting channel. The broadcasting channel may include a satellite channel and a terrestrial channel. According to an example, the electronic device 100 may not include the broadcast receiving unit 153.

The memory 160 may store programs for processing and controlling of the controller 180, and store input/output data (e.g., still images and digital zoom videos).

The memory 160 may include, for example, an internal memory or an external memory. The internal memory may include, for example, at least one of a volatile memory (e.g., a dynamic RAM (DRAM), a static RAM (SRAM), or a synchronous dynamic RAM (SDRAM)), a non-volatile memory (e.g., an one time programmable ROM (OTPROM), a PROM, an erasable and programmable ROM (EPROM), an electrically erasable and programmable ROM (EEPROM), a mask ROM, a flash ROM, a flash memory (e.g., a NAND flash memory or a NOR flash memory), a hard disk drive, and a solid state drive (SSD).

The external memory may include a flash drive, for example, a compact flash (CF) memory card, an SD memory card, a micro-SD memory card, mini-SD memory card, an extreme digital (XD) memory card, a multimedia card (MMC), or a memory stick. Through various interfaces, the external memory may be connected to the electronic device 100 functionally and/or physically.

Also, the electronic device 100 may run a web storage which performs a storage function of the memory 160 over the Internet.

The programs stored in the memory 160 may be classified into a plurality of modules based on functions thereof, for example, a first stabilization module 161, a second stabilization module 162, a UI module 163, and so on.

Figure 21:
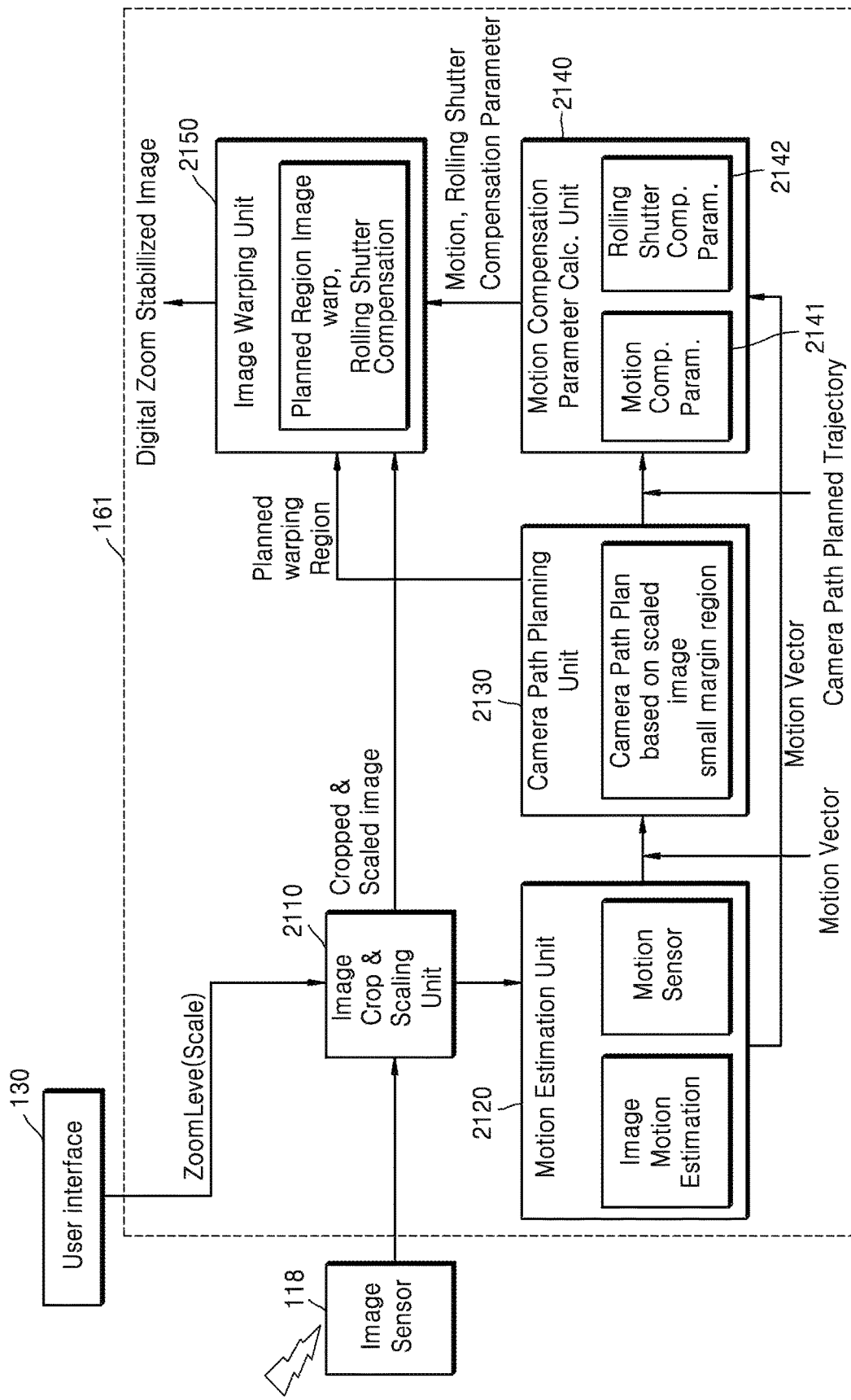
FIG. 21 is a block diagram illustrating an example first stabilization module.

The first stabilization module 161 may stabilize a digital zoom video based on the first stabilization method using a cropping area of an input frame as an area in which it is possible to compensate for shaking. For example, referring to FIG. 21, the first stabilization module 161 may include an image crop and scaling unit 2110, a motion estimation unit 2120, a camera path planning unit 2130, a motion compensation parameter calculation unit 2140, and an image warping unit 2150.

The image crop and scaling unit 2110 may receive the data of an original frame from the image sensor 118, and receive information on a zoom magnification (e.g., a zoom level or a zoom scale) from the UI 130. Based on the zoom magnification, the image crop and scaling unit 2110 may generate an enlarged image by cropping a partial area of the original frame and enlarging the cropped partial area.

The image crop and scaling unit 2110 may transmit the enlarged image generated by enlarging the cropped partial area to the motion estimation unit 2120 and the image warping unit 2150.

The motion estimation unit 2120 may acquire a motion vector (e.g., a global motion vector and a local motion vector) related to the background or the subject by comparing an enlarged image of a previous frame and an enlarged image of a current frame.

The motion estimation unit 2120 may measure motion of the electronic device 100 using at least one sensor (e.g., an acceleration sensor and a gyro sensor) included in the sensing unit 170, and generate a motion vector.

The motion estimation unit 2120 may transmit the motion vector to the camera path planning unit 2130 and the motion compensation parameter calculation unit 2140.

The camera path planning unit 2130 may generate a stabilization path (e.g., a camera path planned trajectory) using the motion vector. The stabilization path may denote a trajectory for compensating for shaking. The camera path planning unit 2130 may determine the stabilization path based at least in part on the size of the enlarged image generated by enlarging the cropped partial area.

The camera path planning unit 2130 may transmit information on the stabilization path (e.g., the camera path planned trajectory) to the motion compensation parameter calculation unit 2140 and the image warping unit 2150.

The motion compensation parameter calculation unit 2140 may generate a motion compensation parameter 2141 for compensating for shaking based on the information on the stabilization path (e.g., the camera path planned trajectory). For example, the motion compensation parameter calculation unit 2140 may generate a parameter for adjusting the position of an output area in the enlarged image according to the stabilization path (e.g., the camera path planned trajectory).

Also, the motion compensation parameter calculation unit 2140 may generate a rolling shutter compensation parameter 2142 for compensating for rolling shutter distortion based on the motion vector received from the motion estimation unit 2120.

The motion compensation parameter calculation unit 2140 may transmit the motion compensation parameter 2141 for compensating for shaking and the rolling shutter compensation parameter 2142 for compensating for rolling shutter distortion to the image warping unit 2150.

The image warping unit 2150 may compensate for shaking or rolling shutter distortion in the enlarged image according to the parameters received from the motion compensation parameter calculation unit 2140. The image warping unit 2150 may generate a stabilized output frame by enlarging the output area according to an output size.

Figure 22:
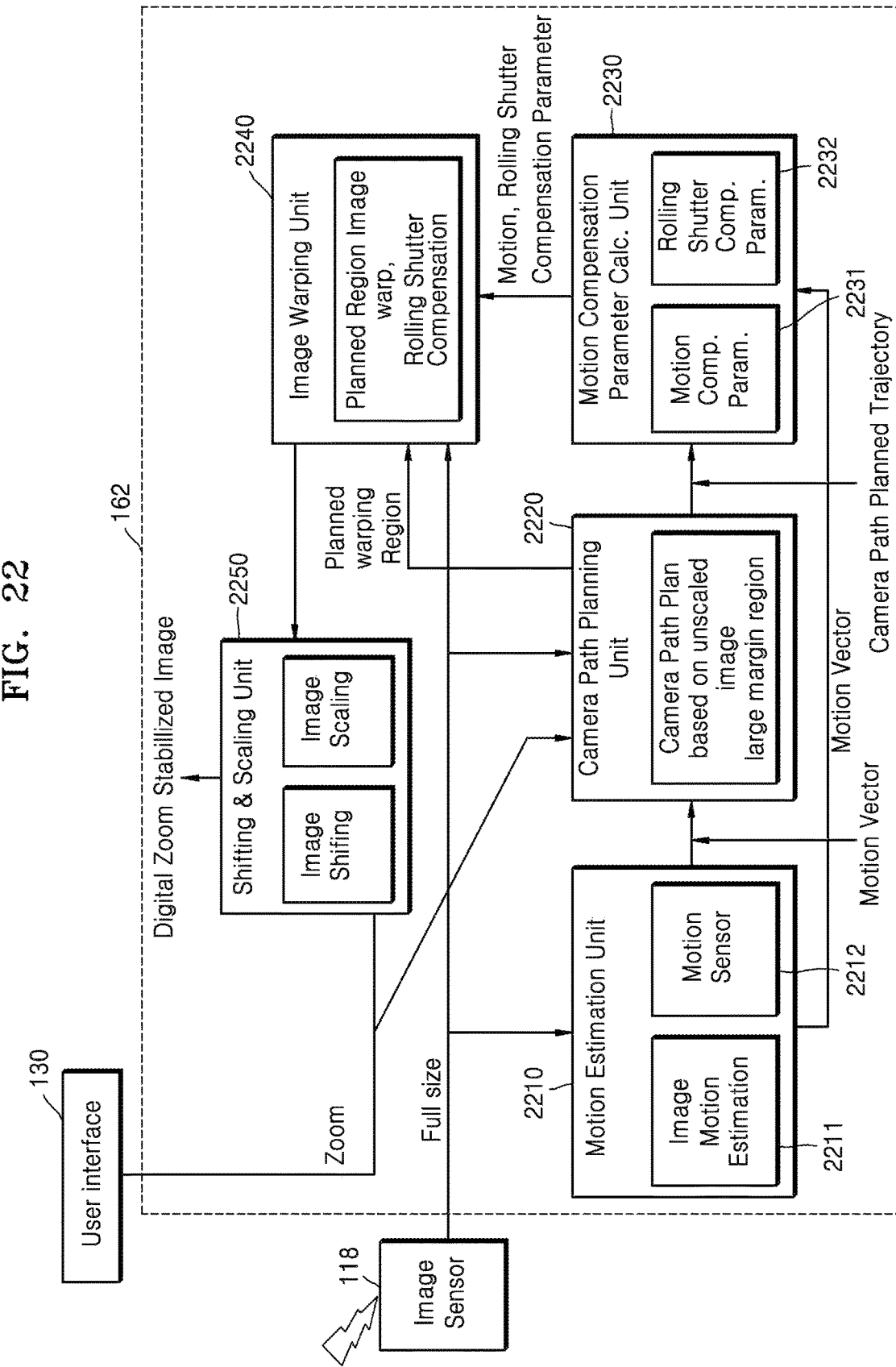
FIG. 22 is a block diagram illustrating an example second stabilization module.

The second stabilization module 162 may stabilize a digital zoom video based on the second stabilization method using the entire area of an input frame as an area in which it is possible to compensate for shaking. For example, referring to FIG. 22, the second stabilization module 162 may include a motion estimation unit 2210, a camera path planning unit 2220, a motion compensation parameter calculation unit 2230, an image warping unit 2240, and a shifting and scaling unit 2250.

The motion estimation unit 2210 may receive an original frame acquired from the image sensor 118, and generate a motion vector of the original frame.

For example, the motion estimation unit 2210 may acquire a motion vector (e.g., a global motion vector and a local motion vector) related to translation of the background or the subject by comparing a previous original frame and the current original frame.

The motion estimation unit 2210 may measure motion of the electronic device 100 using at least one sensor (e.g., an acceleration sensor, a gyro sensor, etc.) included in the sensing unit 170, and generate a motion vector.

The motion estimation unit 2210 may transmit the motion vector to the camera path planning unit 2220 and the motion compensation parameter calculation unit 2230.

The camera path planning unit 2220 may generate a stabilization path (e.g., a camera path planned trajectory) using the motion vector. The stabilization path may denote a trajectory for compensating for shaking. The camera path planning unit 2220 may determine the stabilization path based at least in part on resolution information of original frames.

For example, the camera path planning unit 2220 may set an initial zoom area based on information on the zoom magnification (e.g., the zoom level or the zoom scale) received from the UI 130. Also, the camera path planning unit 2220 may determine the stabilization path which prevents the initial zoom area from deviating from the original frames when the initial zoom area is translated along the stabilization path.

The camera path planning unit 2220 may transmit information on the stabilization path (e.g., the camera path planned trajectory) to the motion compensation parameter calculation unit 2230 and the image warping unit 2240.

The motion compensation parameter calculation unit 2230 may generate a motion compensation parameter 2231 for compensating for shaking based on the information on the stabilization path (e.g., the camera path planned trajectory). For example, the motion compensation parameter calculation unit 2230 may generate a parameter for determining the positions of areas in which it is possible to compensate for shaking in the entire areas of the original frames (or a parameter for resetting the position of the initial zoom area) according to the stabilization path (e.g., the camera path planned trajectory).

Also, the motion compensation parameter calculation unit 2230 may generate a rolling shutter compensation parameter 2232 for compensating for rolling shutter distortion based on the motion vector received from the motion estimation unit 2210.

The motion compensation parameter calculation unit 2230 may transmit the motion compensation parameter 2231 for compensating for shaking and the rolling shutter compensation parameter 2232 for compensating for rolling shutter distortion to the image warping unit 2240.

The image warping unit 2240 may compensate for shaking or rolling shutter distortion in an enlarged image according to the parameters received from the motion compensation parameter calculation unit 2230. For example, the image warping unit 2240 may determine a shaking compensation area in the entire area of an original frame. The image warping unit 2240 may transmit information on the shaking compensation area to the shifting and scaling unit 2250.

The shifting and scaling unit 2250 may shift the shaking compensation area to be positioned at the center of the frame. Then, the shifting and scaling unit 2250 may enlarge the shaking compensation area based on the zoom magnification received from the UI 130. For example, the shifting and scaling unit 2250 may output a stabilized digital zoom image by enlarging the shaking compensation area according to an output size.

The UI module 163 may provide a specialized UI, a GUI, etc. operated in conjunction with the electronic device 100.

The sensing unit 170 may sense a state of the electronic device 100, a state of surroundings of the electronic device 100, and a state of the user who wears the electronic device 100, and transmit information on the sensed states to the controller 180.

For example, the sensing unit 170 may measure a physical quantity or sense an operational state of the electronic device 100, and convert the measured or sensed information into an electrical signal. The sensing unit 170 may include, for example, at least one of a gesture sensor, a gyro sensor, an atmospheric pressure sensor, a magnetic sensor, an acceleration sensor, a grip sensor, a proximity sensor, a color sensor (e.g., a red, green, and blue (RGB) sensor), a biosensor, a temperature/humidity sensor, an illumination sensor, and an ultraviolet (UV) sensor, but is not limited thereto. Since functions of the respective sensors may be intuitively inferred from names thereof by those of ordinary skill in the art, detailed descriptions will be omitted.

The sensing unit 170 may further include a control circuit configured to control one or more sensors included therein. In an example, the electronic device 100 may further include a processor configured to control the sensing unit 170 as a part of the controller 180 or separately from the controller 180, so that the processor may control the sensing unit 170 while the controller 180 is in a sleep state.

The controller 180 may generally be configured to control the overall operation of the electronic device 100. For example, by executing the programs stored in the memory 160, the controller 180 may be configured to control the image capturing unit 110, the analog signal processing unit 120, the image signal processing unit 121, the UI 130, the output unit 140, the communication interface 150, the sensing unit 170, etc. overall.

By running an operating system (OS) or an application program, the controller 180 may be configured to control a plurality of hardware or software components connected thereto, and to perform a variety of data processing and calculations. The controller 180 may be implemented as, for example, a system on chip (SoC). For example, the controller 180 may include one or more of a central processing unit (CPU), an application processor (AP), and a communication processor (CP). According to an embodiment, the controller 180 may further include a graphics processing unit (GPU).

According to an example, the controller 180 may be configured to acquire shaking information of the plurality of frames using information on movement of the subject included in the plurality of frames or movement of the electronic device 100.

For example, the controller 180 may be configured to acquire first movement information of the movement of the subject included in the plurality of frames based on results of comparing the plurality of frames. Using at least one sensor included in the electronic device 100, the controller 180 may be configured to acquire second movement information about the movement of the electronic device 100 corresponding to the duration of acquiring the plurality of frames. The controller 180 may be configured to acquire shaking information about the respective plurality of frames using at least one of the first movement information and the second movement information.

The controller 180 may be configured to determine shaking compensation areas corresponding to the respective plurality of frames in the entire areas of the respective plurality of frames based on the shaking information about the plurality of frames and information on the zoom magnification.

For example, the controller 180 may be configured to determine a stabilization path opposed to the movement of the electronic device 100 or corresponding to the movement of the subject based on the shaking information, and determine shaking compensation areas corresponding to the respective plurality of frames according to the stabilization path. At this time, the controller 180 may be configured to determine the stabilization path based at least in part on resolution information of the plurality of frames.

The controller 180 may be configured to generate output frames corresponding to the respective plurality of frames by enlarging the shaking compensation areas at a magnification, and to generate a digital zoom video by combining the output frames.

According to an example, the controller 180 may be configured to determine the zoom magnification and the initial zoom area based on a pinch input received through the touch screen in which a preview image is displayed.

Also, the controller 180 may be configured to correct rolling shutter distortion of at least one of the plurality of frames based on a motion vector of the plurality of frames. In addition, the controller 180 may be configured to compensate at least one of the plurality of frames for rotation based on rotational component information included in shaking information.

A method according to an example may be embodied in the form of program commands to be executed through various computing units, and recorded in a computer-readable recording medium. The computer-readable recording medium may include program commands, data files, data structures, etc. solely or in combination. The program commands recorded in the computer-readable recording medium may be particularly designed or configured for the disclosure or may be known to and used by those of ordinary skill in the computer software art. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, designed to store and execute the program commands. Examples of the program commands include a high-end language code executable by a computer using an interpreter, etc. as well as a machine language code created by a compiler.

According to an example, the electronic device 100 may translate an initial zoom area in the entire area of an original frame to determine a shaking compensation area. Compared with a method of determining a shaking compensation area only in a cropping area of the original frame, it is possible to compensate for shaking to a greater extent.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

What is claimed is:

1. A method of stabilizing a video in an electronic device, comprising:
   acquiring a plurality of input frames at constant magnification using an image signal input from an image sensor;
   receiving an input requesting enlargement at a magnification in relation to the plurality of input frames;
   acquiring shaking information of the plurality of input frames using at least one of: information on movement of a subject included in the plurality of frames, and movement of the electronic device;
   determining shaking compensation areas in entire areas of each of the plurality of input frames for the respective plurality of input frames, after and based at least on receiving the input requesting enlargement, said determining of the shaking compensation areas being based on the shaking information of the plurality of input frames and information on the magnification from the input requesting enlargement;
generating output frames corresponding to the respective plurality of input frames by enlarging the shaking compensation areas at the magnification; and
providing a video including the output frames.

2. The method of claim 1, wherein the acquiring of the plurality of input frames comprises acquiring frames having a maximum angle of view obtained by the electronic device.

3. The method of claim 1, wherein the receiving of an input comprises:
receiving a pinch input through a touch screen on which a preview image is displayed; and
determining the magnification and an initial zoom area based on the pinch input.

4. The method of claim 1, wherein the acquiring of the shaking information of the plurality of input frames comprises:
acquiring first movement information of the movement of the subject included in the plurality of input frames based on comparing the plurality of frames;
acquiring second movement information of the movement of the electronic device corresponding to a duration of acquisition of the plurality of input frames using at least one sensor included in the electronic device; and
acquiring the shaking information of the plurality of input frames using at least one of the first movement information and the second movement information.

5. The method of claim 1, wherein the determining of the shaking compensation areas for the respective plurality of input frames comprises:
determining a stabilization path opposed to the movement of the electronic device or corresponding to the movement of the subject based on the shaking information; and
determining the shaking compensation areas corresponding to the respective plurality of frames based on the stabilization path.

6. The method of claim 5, wherein the determining of the stabilization path comprises determining the stabilization path based at least in part on resolution information of the plurality of input frames.

7. The method of claim 1, wherein the generating of the output frames comprises correcting rolling shutter distortion of at least one of the plurality of frames based on motion vectors of the plurality of frames.

8. The method of claim 1, wherein the generating of the output frames corresponding to the respective plurality of input frames comprises compensating for rotation in at least one of the plurality of input frames based on rotational component information included in the shaking information.

9. The method of claim 8, wherein the compensating for the rotation in the at least one input frame comprises:
translating a first shaking compensation area of a first frame among the plurality of frames to a central area of the first frame;
rotating the first shaking compensation area by an angle; and
translating the rotated first shaking compensation area to the central area of the first frame.

10. The method of claim 1, further comprising:
providing a selection window configured to enable selection of a first stabilization method of determining a shaking compensation area in a cropping area of an input frame or a second stabilization method of determining a shaking compensation area in an entire area of an input frame; and
generating the video based on the method selected through the selection window.

11. The method of claim 10, further comprising:
providing a graphical user interface (GUI) including a first play button corresponding to a first video generated by the first stabilization method and a second play button corresponding to a second video generated by the second stabilization method; and
playing one of the first video and the second video based on a selection of one of the first play button and the second play button.

12. An electronic device comprising:
a user interface (UI) configured to receive an input requesting enlargement at a magnification in relation to a plurality of frames at constant magnification acquired from an image sensor;
a controller configured to acquire shaking information of the plurality of frames using at least one of information on movement of a subject included in the plurality of frames and movement of the electronic device, to determine shaking compensation areas in entire areas of each of the plurality of frames for the respective plurality of frames based on the shaking information of the plurality of frames and information on the magnification from the input requesting enlargement, and to generate output frames corresponding to the respective plurality of frames by enlarging the shaking compensation areas at the magnification; and
an output configured to output a video including the output frames.

13. The electronic device of 12, wherein angles of view of the respective plurality of frames are wider than angles of view of the output frames.

14. The electronic device of 12, wherein the UI receives a pinch input through a touch screen on which a preview image is displayed, and
the controller is configured to determine the magnification and an initial zoom area based on the pinch input.

15. The electronic device of 12, wherein the controller is configured to acquire first movement information of the movement of the subject included in the plurality of frames based on results of comparing the plurality of frames, to acquire second movement information of the movement of the electronic device corresponding to a duration of acquisition of the plurality of frames using at least one sensor included in the electronic device, and to acquire the shaking information of the plurality of frames using at least one of the first movement information and the second movement information.

16. The electronic device of 12, wherein the controller is configured to determine a stabilization path opposed to the movement of the electronic device or corresponding to the movement of the subject based on the shaking information, and to determine the shaking compensation areas corresponding to the respective plurality of frames based on the stabilization path.

17. The electronic device of 16, wherein the controller is configured to determine the stabilization path based at least in part on resolution information of the plurality of frames.

18. The electronic device of 12, wherein the controller is configured to correct rolling shutter distortion of at least one of the plurality of frames based on motion vectors of the plurality of frames.

19. The electronic device of 12, wherein the controller is configured to compensate for rotation in at least one of the plurality of frames based on rotational component information included in the shaking information.

20. A non-transitory computer-readable recording medium in which a program for implementing the method of claim 1 is recorded.

* * * * *